US011269673B2

(12) United States Patent
Miller et al.

(10) Patent No.: US 11,269,673 B2
(45) Date of Patent: *Mar. 8, 2022

(54) CLIENT-DEFINED RULES IN PROVIDER NETWORK ENVIRONMENTS

(71) Applicant: Amazon Technologies, Inc., Seattle, WA (US)

(72) Inventors: Kevin Christopher Miller, Fairfax, VA (US); Joseph E. Magerramov, Bellevue, WA (US); Marcin Piotr Kowalski, Seattle, WA (US); Colm Gearóid MacCárthaigh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/415,877

(22) Filed: May 17, 2019

(65) Prior Publication Data

US 2019/0281140 A1  Sep. 12, 2019

Related U.S. Application Data

(63) Continuation of application No. 14/961,702, filed on Dec. 7, 2015, now Pat. No. 10,298,720.

(51) Int. Cl.
*G06F 15/16* (2006.01)
*G06F 9/455* (2018.01)
(Continued)

(52) U.S. Cl.
CPC ...... *G06F 9/45558* (2013.01); *G06F 21/6281* (2013.01); *H04L 41/00* (2013.01);
(Continued)

(58) Field of Classification Search
CPC ... G06F 2009/45595; G06F 2009/4557; G06F 2009/45591; G06F 9/45558;
(Continued)

(56) References Cited

U.S. PATENT DOCUMENTS 6,625,689 B2   9/2003   Narad et al.
6,819,195 B1   11/2004  Blanchard et al.
(Continued)

OTHER PUBLICATIONS

U.S. Appl. No. 14/871,690, filed Sep. 30, 2015, Kevin Christopher Miller, et al.

*Primary Examiner* — Ruolei Zong
(74) *Attorney, Agent, or Firm* — Robert C. Kowert; Kowert, Hood, Munyon, Rankin & Goetzel, P.C.

(57) ABSTRACT

Methods and apparatus that allow clients to specify custom network rules for their resource instances or network constructs in a provider network environment. Services and interfaces may be provided that allow a client to provide an executable module that implements custom rules for their resources, or alternatively to specify or select custom rules for their resources. The module may be installed on a host device, and may apply the custom rules to packets to and from the client's resources. Alternatively, the client-defined rules may be applied to packet flows according to the custom rules specified by the client and applied by a client rules service implemented on the provider network external to the host device or on a client resource instance on the host (Continued)

device. The custom network rules may, for example, extend or modify standard network rules for the client's resources on the host device.

20 Claims, 18 Drawing Sheets

(51) Int. Cl.
*H04L 67/01* (2022.01)
*H04L 41/00* (2022.01)
*H04L 29/06* (2006.01)
*G06F 21/62* (2013.01)
*H04L 67/10* (2022.01)
*H04L 67/141* (2022.01)

(52) U.S. Cl.
CPC .............. *H04L 63/00* (2013.01); *H04L 67/10* (2013.01); *H04L 67/141* (2013.01); *H04L 67/42* (2013.01); *G06F 2009/45595* (2013.01)

(58) Field of Classification Search
CPC ............. G06F 9/45533; H04L 12/4641; H04L 29/06523; H04L 43/08; H04L 47/10; H04L 47/805; H04L 63/1408; H04L 63/0263; H04L 67/1002; H04L 67/42
USPC ........................................................ 709/203
See application file for complete search history.

(56) References Cited

U.S. PATENT DOCUMENTS

| | | | |
|---|---|---|---|
| 6,975,628 B2 | 12/2005 | Johnson et al. | |
| 8,595,262 B1* | 11/2013 | Hayden | G06F 16/2471 |
| | | | 707/798 |
| 9,042,403 B1 | 5/2015 | Vincent et al. | |
| 9,571,507 B2* | 2/2017 | Cooper | G06F 21/606 |
| 9,749,226 B2 | 8/2017 | Hamdi et al. | |
| 10,298,720 B1 | 5/2019 | Miller et al. | |
| 2012/0233668 A1* | 9/2012 | Leafe | G06F 9/00 |
| | | | 726/4 |
| 2012/0250686 A1 | 10/2012 | Vincent et al. | |
| 2012/0317566 A1 | 12/2012 | Santos et al. | |
| 2013/0016719 A1 | 1/2013 | Johnsen et al. | |
| 2013/0254766 A1 | 9/2013 | Zuo et al. | |
| 2013/0322446 A1 | 12/2013 | Biswas et al. | |
| 2014/0059226 A1* | 2/2014 | Messerli | H04L 47/783 |
| | | | 709/226 |
| 2014/0280884 A1* | 9/2014 | Searle | H04L 43/0864 |
| | | | 709/224 |
| 2016/0308895 A1 | 10/2016 | Kotler et al. | |
| 2016/0316003 A1* | 10/2016 | Snider | H04L 47/70 |
| 2016/0359872 A1* | 12/2016 | Yadav | H04L 43/0894 |
| 2017/0078329 A1* | 3/2017 | Hwang | H04L 63/0263 |

* cited by examiner

CLIENT-DEFINED RULES IN PROVIDER NETWORK ENVIRONMENTS

This application is a continuation of U.S. patent application Ser. No. 14/961,702, filed Dec. 7, 2015, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Figure 1A:
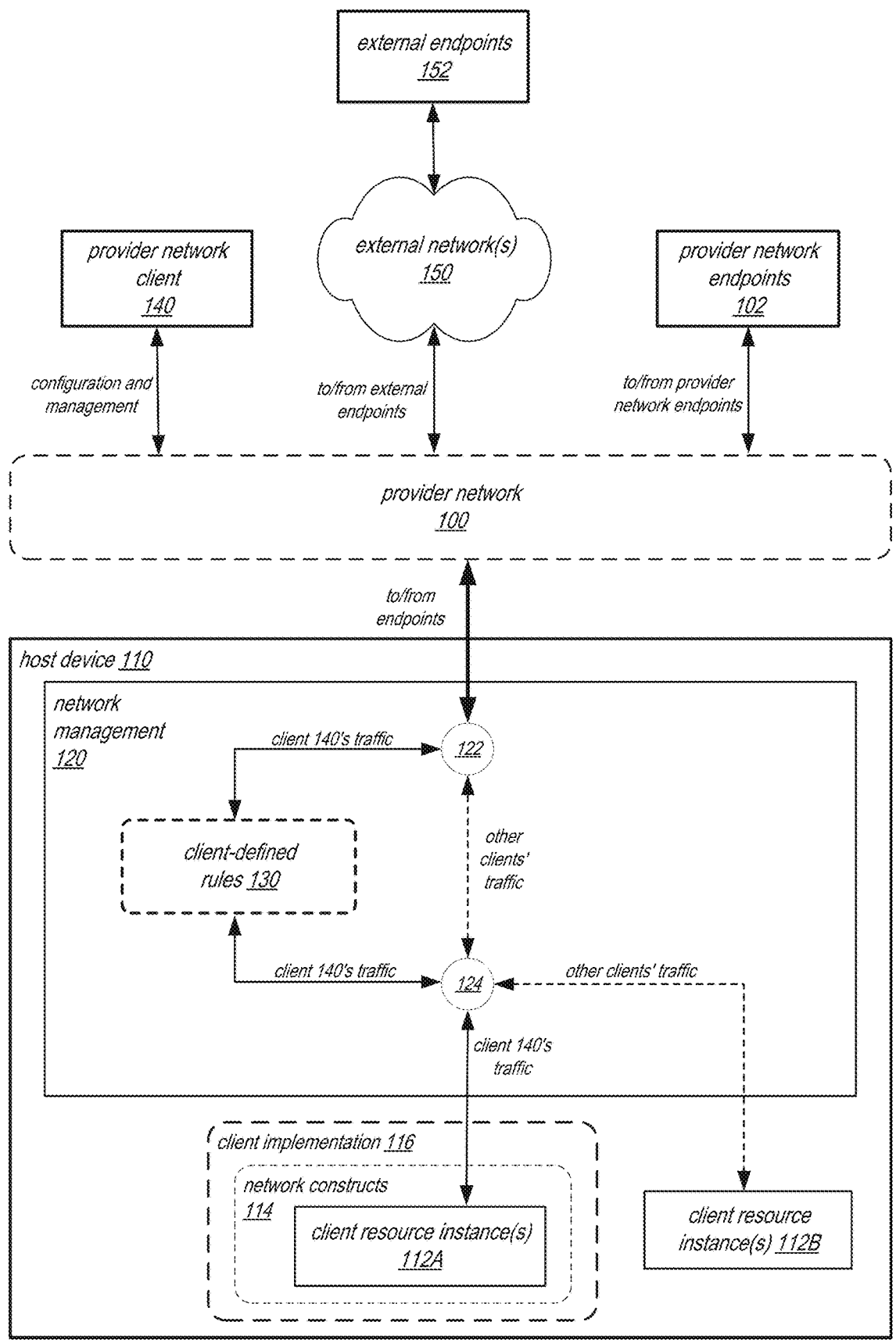
FIGS. 1A through 1D illustrate implementation and application of client-defined rules for a client's resources in a provider network environment, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for providing client-defined rules for clients' resources in provider network environments are described. A service provider that provides a provider network for clients may provide services and application programming interfaces (APIs) that allow clients to establish and manage resources in client implementations on the provider network including but not limited to client private networks implementations on the provider network. A private network in a provider network environment may be broadly defined as a network space (e.g., logically defined by an address range or address space) that contains a set of provider network resources of a respective client, and that acts as a logically isolated section on the provider network for the client's resources. A private network may implement a private or local Internet Protocol (IP) address space according to a network protocol, for example 32-bit IP addresses within an Internet Protocol version 4 (IPv4) address range or subnet. Sources (e.g., endpoints such as computation resources, storage resources, servers, host devices, etc.) on a private network may be assigned IP addresses (e.g., 32-bit IPv4 addresses) within the private network's address space.

A client's implementation, for example a private network, on the provider network includes the client's resource instances, such as virtual machines (VMs) on host devices configured as virtual computing resource instances by the client. At least some of the resource instances on a provider network may be implemented according to hardware virtualization technology that enables multiple operating systems to run concurrently on a host computer, i.e. as VMs on a host device. A hypervisor, or virtual machine monitor (VMM), on the host device presents the VMs on the respective host with a virtual platform and monitors the execution of the VMs on the host device. Each VM may be provided with one or more IP addresses; the VMM on a respective host may be aware of the IP addresses of the VMs on the host.

In some embodiments, a host device may implement provider network packet processing functionality as part of general host system processing. For example, the VMM may include components that implement provider network packet processing functionality. In some embodiments, as an alternative, a host device may include or may be coupled to one or more network processing devices that process network traffic (e.g., packet flows) between the resource instances on the host device and the provider network that implement at least part of the provider network packet processing functionality on the host device. As a non-limiting example, a network processing device may be a Peripheral Component Interconnect (PCI) device plugged into a PCI expansion slot or PCI bus of the host device. A network processing device may, for example, connect to a host I/O interface (e.g., a PCI bus), and may receive client packets from and send client packets to VMs executing on the host device via the host I/O interface. A network processing device may also include one or more network ports connected to the provider network, and may receive provider network packets from and send provider network packets onto the provider network via the port(s). A network processing device may also include, but is not limited to, one or more processors (e.g., multicore processor(s)), a memory, and an internal I/O interface. The processor(s) may be custom or proprietary processors, or alternatively may be general-purpose processors.

The provider network packet processing functionality on a host device may apply provider network-related functions to packets received by the device. For example, the provider network packet processing functionality may implement provider network encapsulation protocol technology to encapsulate and route network packets (e.g., IP packets received from resource instances on the host device) over a network substrate within the provider network, and to decapsulate IP packets targeted at the resource instance(s) on the host device and forward the decapsulated packets to the target resource instance(s). In addition, the provider network packet processing functionality may apply private network-related functions to packets received by the device. For example, the provider network packet processing functionality may enforce security group, access control rules, access control lists (ACLs), subnets, and/or other access control functionality for clients' private networks on the provider network, for example as described in reference to FIGS. 12 and 13.

Conventionally, the provider network packet processing functionality implemented on a host device applies a standard set of provider network-related functions and rules for all clients' resources and implementations on host devices in the provider network. For example, conventionally, when a client creates a security group that includes one or more resource instances, a set of standard security group rules provided by the service provider are applied to packets and packet flows from and to the resource instances in that security group.

Embodiments of methods and apparatus are described that allow clients to implement client-defined rules for the respective clients' resources and implementations. In some embodiments, the client-defined rules may be applied at the packet level by modules or components on the host device that are generated from or that execute client-provided code or instructions. In alternative embodiments, the client-defined rules may instead be applied at the connection or flow level according to sets of rules defined by the clients and applied by a client rules service implemented on the provider network external to the host device, or alternatively implemented on a client resource instance on the host device.

In some embodiments, the client-defined rules may be applied to all resource instances in the client's implementation on the provider network, to particular resources instances, or to particular constructs of the client's implementation that include one or more of the client's resource instances such as private networks, subnets, and security groups. In some embodiments, a client may define the rules for their resource instances, constructs, and implementations on the provider network using the services and APIs that are used to configure and manage their virtual resource instances on their client private network.

Embodiments of the methods and apparatus for providing client-defined rules for clients' resources in provider network environments may, for example, be implemented in the context of a service provider that provides to clients or customers, via an intermediate network such as the Internet, virtualized resources (e.g., virtualized computing and storage resources) implemented on a provider network of the service provider, typically in a data center of the service provider. FIGS. 1A through 4 illustrate example provider network environments in which embodiments of the methods and apparatus for providing client-defined rules for clients' resources in provider network environments may be implemented. FIGS. 9 through 13 and the section titled Example provider network environments further illustrate and describe example service provider network environments in which embodiments of the methods and apparatus as described herein may be implemented.

Figure 14:
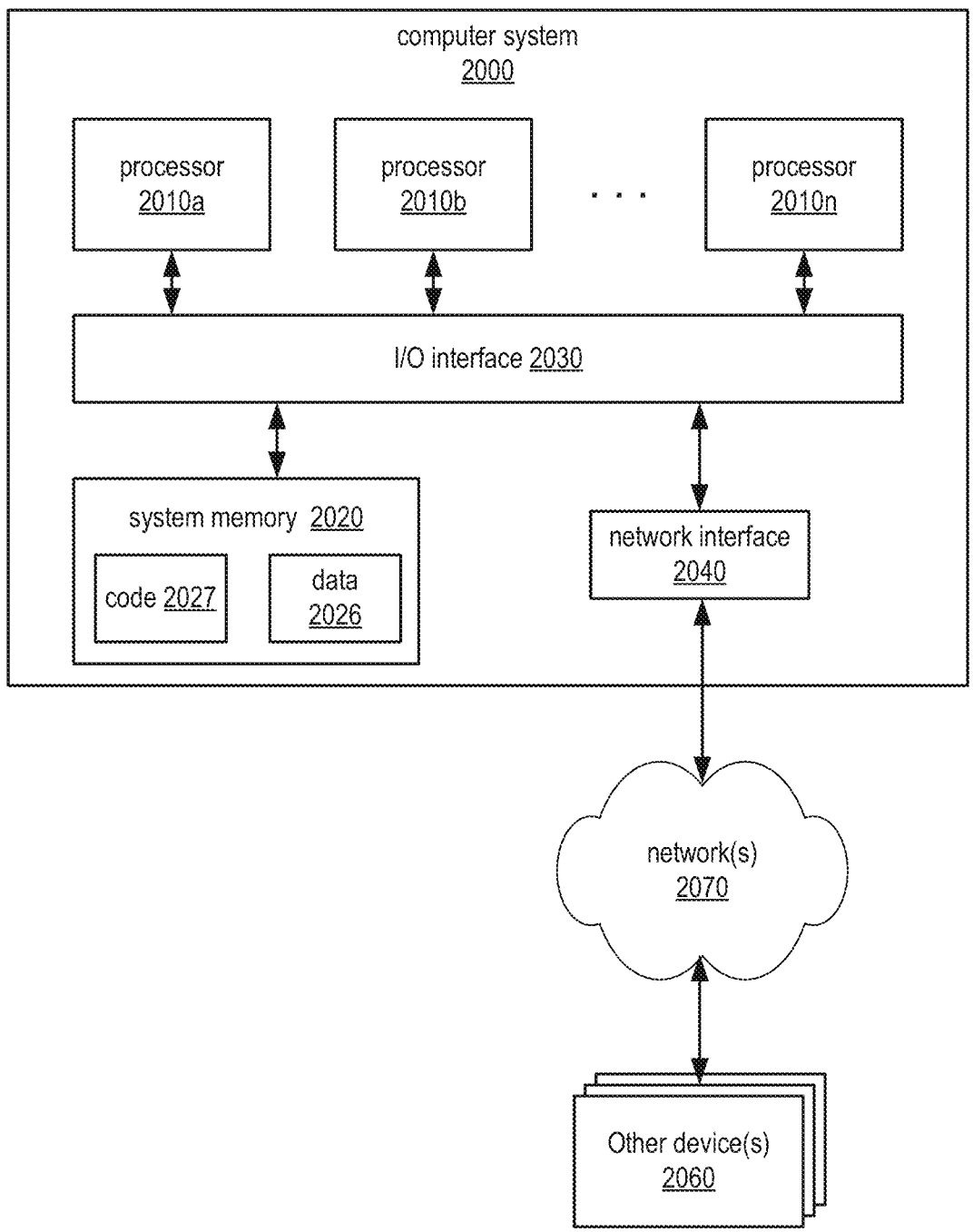
FIG. 14 is a block diagram illustrating an example computer system that may be used in some embodiments.

FIGS. 1A through 1D illustrate implementation and application of client-defined rules for a client's resources in a provider network environment, according to some embodiments. As shown in FIG. 1A, a provider network client 140 may configure and manage an implementation 116 on the provider network 100. For example, the implementation 116 may be a client private network on the provider network 100 with an address space on the provider network 100. A client 140's implementation 116, for example a private network on the provider network 100, includes the client 140's resource instances 112A, such as virtual machines (VMs) on host device(s) 110 configured and managed as virtual computing resource instances by the client 140. The resource instance(s) 112A may be assigned addresses within the private network's address space. Packets sent from the resource instance(s) 112A may be encapsulated by a network management 120 component of the host device 110 and routed to their destinations via the provider network 100. Packets sent to the resource instance 112A may be decapsulated by the network management 120 component of the host device 110 and provided to respective resource instance(s) 112A. FIG. 14 shows an example system that may be used as a host device 110 in some embodiments.

In some embodiments, resource instances 112 on the host device 110 may be virtualized computing resources implemented on multi-tenant hardware that is shared with other client(s). In these embodiments the other clients may configure and manage other resource instances 112B on the host device 110. In these embodiments, the other clients' traffic may be handled and routed to and from their respective resource instances 112B on the host device 110 by the network management 120 component of the host device 110.

In some embodiments, the network management 120 component of the host device 110 may implement provider network packet processing functionality and may apply provider network-related functions to packets and packet flows received by the network management 120 component from client resource instances 112 on the host device 110 and from the provider network 100. For example, the network management 120 component may implement provider network encapsulation protocol technology to encapsulate and route client packets received from resource instances 112 over a network substrate within the provider network 100 as provider network packets to provider network endpoints 102 or endpoints 152 on an external network 150, and to decapsulate packets received in provider network packets from provider network endpoints 102 or endpoints 152 on an external network 150 via the provider network 100 and forward the decapsulated packets to respective resource instances 112. In addition, the network management 120 component may implement standard provider network functionality. For example, in some embodiments, the network management 120 component may apply standard private network functions related to network constructs 114 in the client 140's implementation 116 such as security groups and subnets to packets and packet flows on connections established between the client resource instances 112 on the host device 110 and external endpoints 152 or provider network endpoints 102.

In some embodiments, the client 140 may provide client-defined rules 130 when configuring and managing resource instances 112A and network constructs 114 in their implementation 116 on the provider network 100. The client-defined rules 130 may replace, modify, or extend the standard provider network functionality provided by the network management 120 component of the host device 110. In some embodiments, the client 140 may provide the client-defined rules 130 for resource instances 112A and network constructs 114 using the services and APIs provided by the service provider that are used to configure and manage their implementation 116 on the provider network 100.

While FIG. 1A shows client-defined rules 130 for a particular client 140, the network management 120 component on a host device 110 may implement two or more distinct sets of client-defined rules 130 with different client-defined rules 130 provided by one or more provider network clients.

In some embodiments, the provider network environment may include one or more mechanisms that may ensure that the client-defined rules 130 comply with provider network protocols, for example protocols that provide security for and isolation of client data and resources on the provider network 100. For example the service provider may provide mechanisms such as development environments, services and APIs, and execution environments that limit the scope of the operations that can be implemented by the client-defined rules 130. In some embodiments, the client-defined rules 130 may be wrapped by the provider network functionality of the network management 120 component to assure that one client's network rules 130 do not interfere with another client's traffic, and to provide isolation of and security for the clients' data and resource instances on the provider network.

Figure 2A:
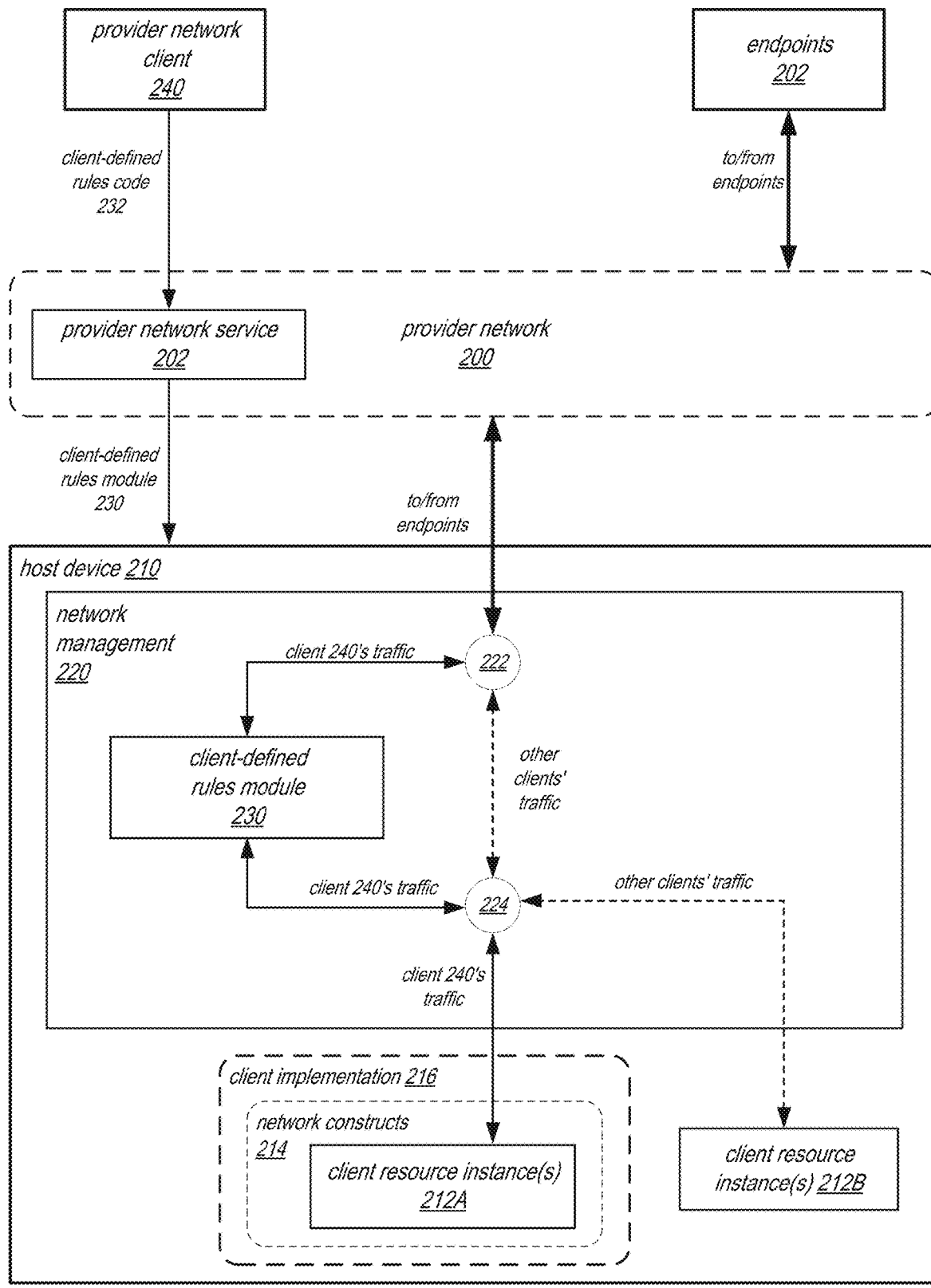
FIG. 2A illustrates a client-defined rules module that implements and applies client-defined rules for a client's resource instances on a host device in a provider network environment, according to some embodiments.
Figure 2B:
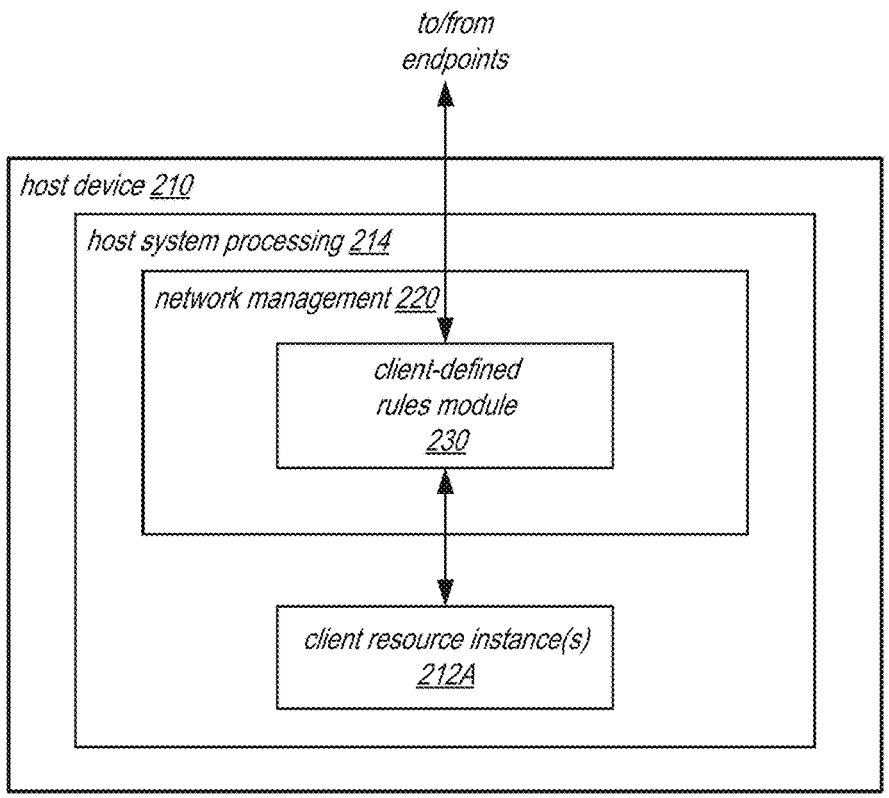
FIG. 2B illustrates a client-defined rules module implemented within host system processing on a host device in a provider network environment, according to some embodiments.
Figure 2C:
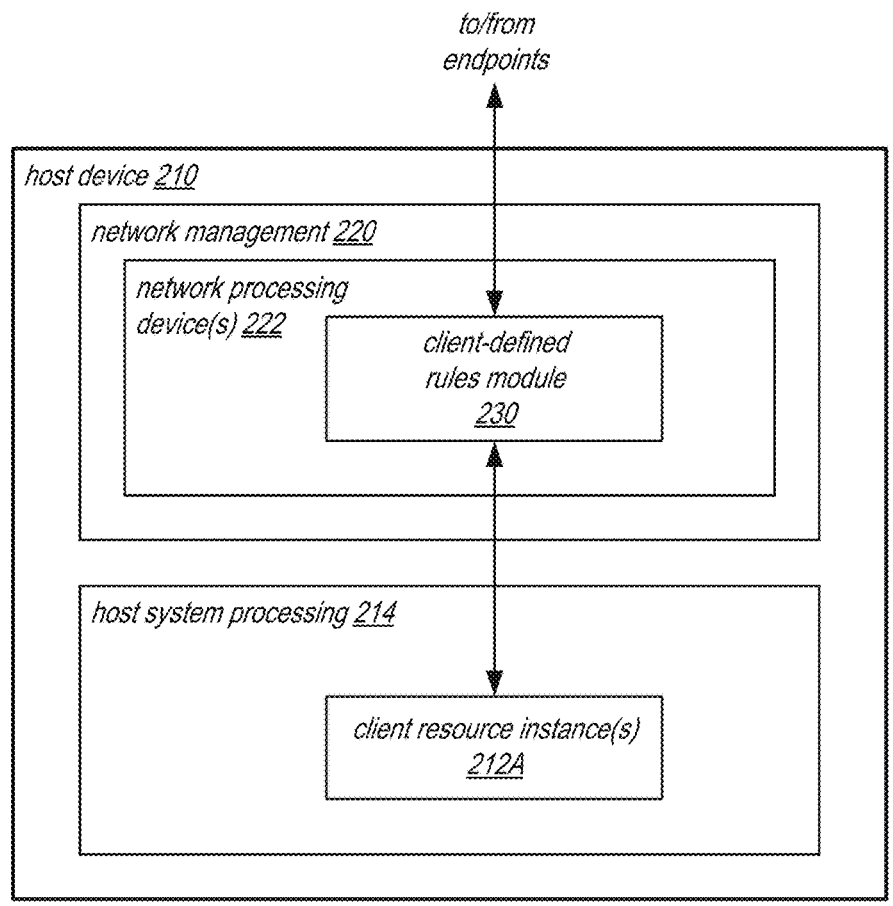
FIG. 2C illustrates a client-defined rules module implemented by a network processing device of a host device in a provider network environment, according to some embodiments.

In some embodiments, the client-defined rules 130 may be applied at the packet level by executable modules installed on the host device 110 that are generated from client-provided software code, for example as illustrated in FIGS. 2A through 2C. When processing incoming and outgoing packets, respectively, components 122 and 124 of the network management 120 component of the host device 110 may examine the packets to determine packets from or packets to the client 140's resource instances 112A on the host device 110, for example according to virtual interfaces assigned to the resource instances 112A by the provider network 100, and pass the client 140's packets to the client-defined rules 130 module for additional processing according to the client-defined rules 130. Other clients' incoming and outgoing traffic for resource instances 112B may be processed according to the standard provider network processing of the network management 120 component.

In some embodiments, the code may be written by the client 140 according to specifications provided by the service provider. In some embodiments, the code may be written in any of a variety of scripting or programming languages, including but not limited to compiled programming languages and interpreted programming languages. In some embodiments, the service provider may provide a high-level, domain-specific programming language and environment to clients via which the client 140 may develop code for client-defined rules 130 modules. The programming language and environment may, for example, provide interfaces, templates, formats, and protocols for defining rules 130 and for integrating the client-defined rules 130 with the provider network functionality. The domain-specific programming language and environment may "sandbox" the client's code to ensure compliance with provider network protocols, for example provider network encapsulation protocols, packet routing protocols, and security and isolation protocols, to ensure that the client 140's code does not go outside the bounds of the client 140's allocated resources including memory, bandwidth, and processor resources. In some embodiments, the client 140 may compile the code and provide an executable module to the service provider for installation on host device 110. Alternatively, the client 140 may provide the code to the service provider, and the service provider may compile the code to generate a module for installation on host device 110. In some embodiments, the client-defined rules 130 module may be instantiated using virtualization technology to execute in a virtual environment as a virtual machine (VM) or virtual process on the network management 120 component of the host device 110.

In some embodiments, alternatives to a client-defined rules 130 module compiled from code developed by the client using a compiled programming language and installed and executed on a host device 110 may be used. For example, in some embodiments, the code may be developed in an interpreted language and provided to the service provider by the client. An interpreter component or engine on the host device 110 or elsewhere on the provider network may then execute the code directly. As another example, in some embodiments, the code may be developed in a language that is directly executable on dedicated machine architecture for executing client-defined rules and provided to the service provider by the client. An instance of the dedicated machine architecture on the host device 110 or elsewhere on the provider network may then execute the code directly.

Figure 3:
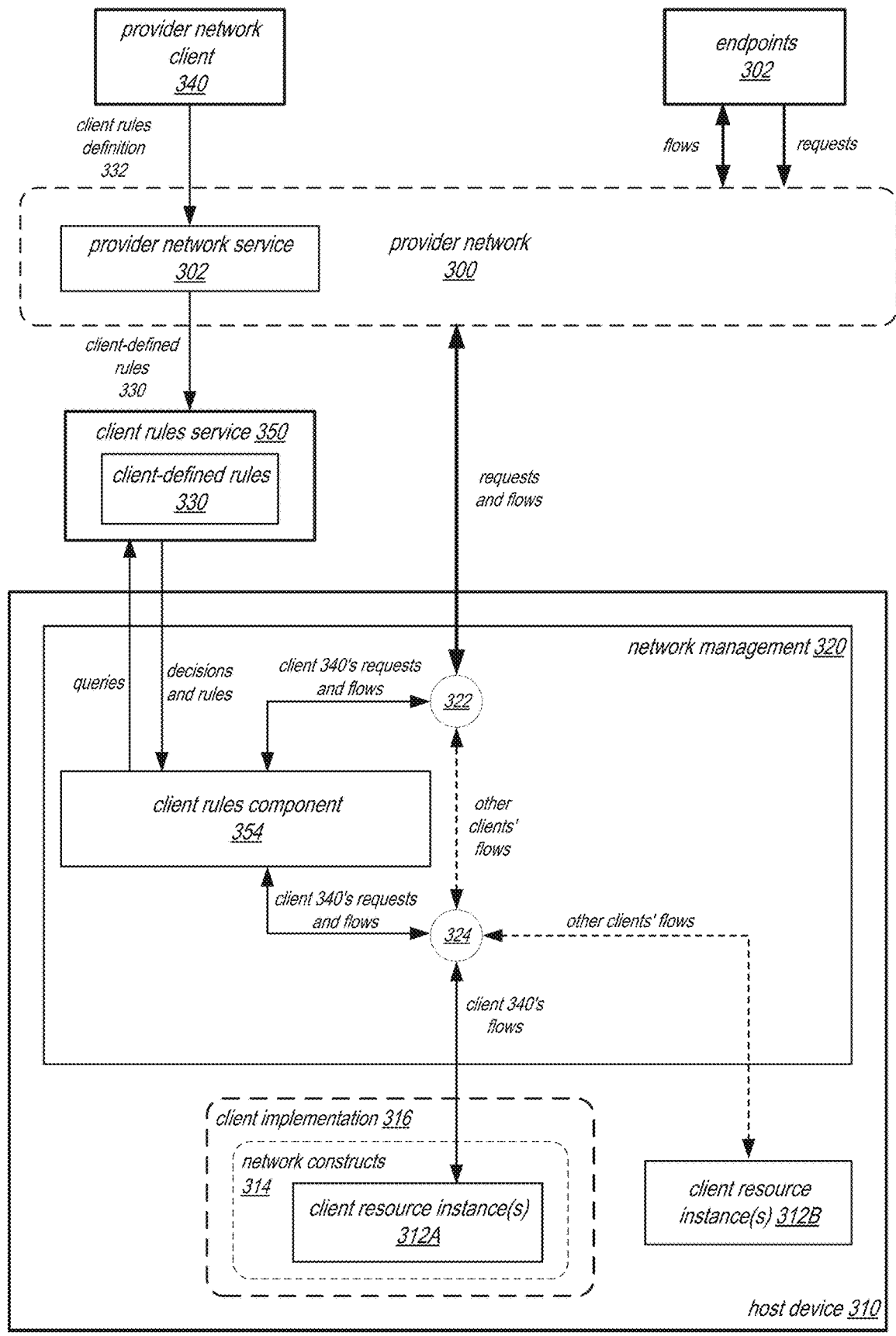
FIG. 3 illustrates a client rules service in a provider network environment that determines client-defined rules for packet flows to a client's resource instances based on input from a client rules component of a host device in the provider network environment, according to some embodiments.
Figure 4:
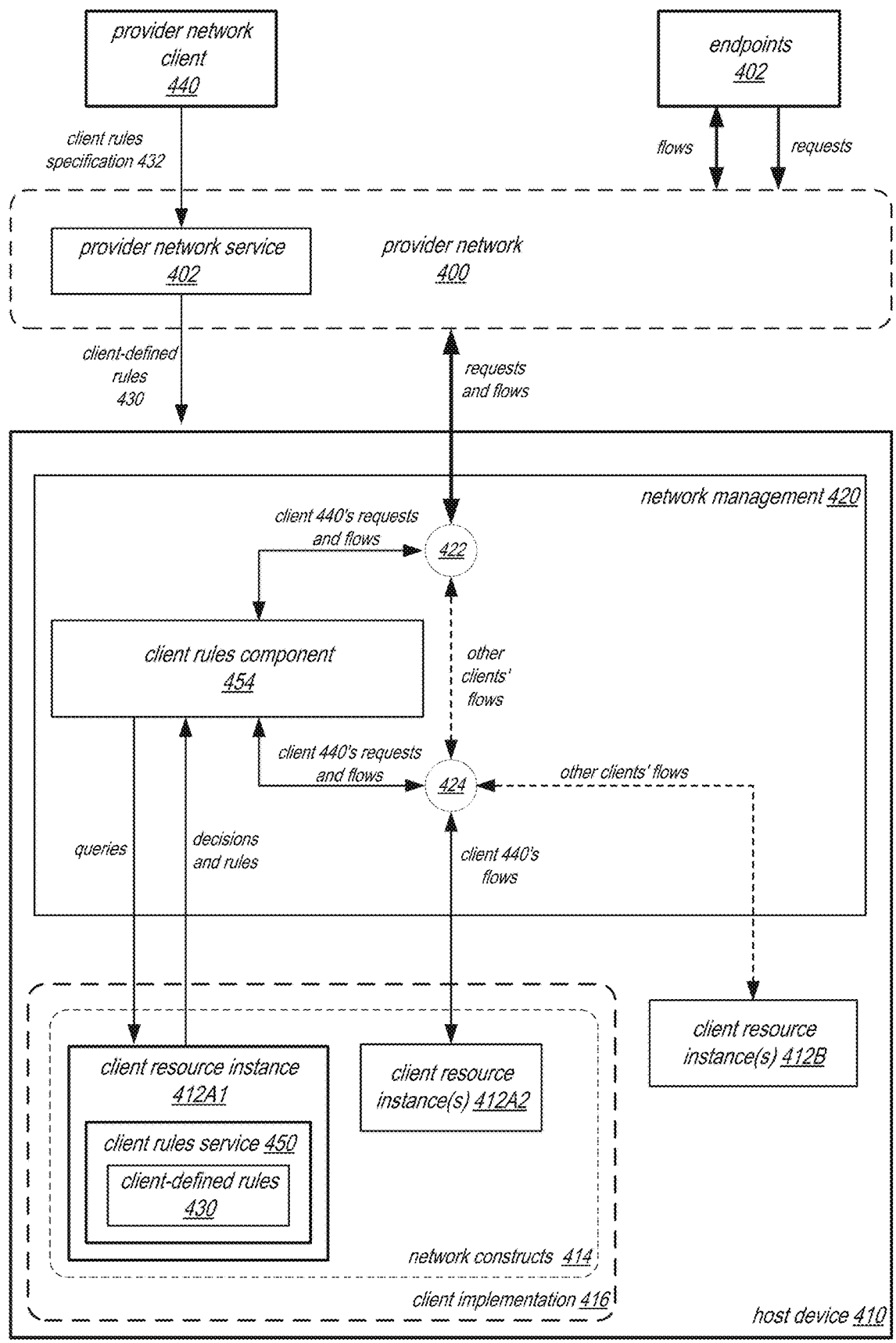
FIG. 4 illustrates a client rules service implemented on a client's resource instance on a host device in a provider network environment that determines client-defined rules for packet flows to the client's resource instances based on input from a client rules component of the host device, according to some embodiments.

In some embodiments, the client-defined rules 130 may instead be applied at the connection or flow level according to a set of rules provided by the client 140 to a client rules service and applied by a client rules component and the client rules service, as illustrated in FIGS. 3 and 4. Applying the client-defined rules 130 at the connection or flow level may allow a client-defined rules-based decision to be made once for a connection to a resource instance 112A or construct 114 by a client rules service external to the network management 120 component of the host device 110. The decision and applicable rules are then applied to the packet flow on the connection by the client rules component of the network management 120 component. Thus, the network management 120 component does not have to make a client-defined rules-based decision for each packet in data flows over connections to the resource instances 112A or constructs 114; instead, the network management component queries the client rules service to determine the rules to apply to all packets in the data flows on the connections.

In some embodiments, the client rules component may be implemented on the host device 110, for example as a component of the network management 120 component as illustrated in FIGS. 3 and 4. The client rules service may be implemented on the provider network external to the host device 110 as illustrated in FIG. 3, or alternatively may be implemented by one or more of client 140's resource instances 112A on the host device 110 as illustrated in FIG. 4. In some embodiments, when creating a new or modifying an existing resource instance 112A or construct 114 such as a security group or subnet, the client 140 may be allowed to define rules 130 for the resource instance 112A or construct 114, for example by providing a client-defined rules file such as a markup language (e.g., extensible markup language (XML)) file or other structure that includes the client-defined rules 130, or by defining the rules 130 using an interface to a provider network service implemented by one or more devices on the provider network. For example, in some embodiments, when creating or modifying a security group, the client may define a set of custom rules for their security group that replace, extend, or modify standard or default security group rules. In some embodiments, a set of custom rules, or templates for custom rules, that replace, extend, or modify standard or default rules may be displayed on an interface to a service, and the client may be allowed to select or define the custom rules that they want to add for their security group via the interface.

In some embodiments, to apply the client-defined rules 130 to the packet flows, the network management 120 component may receive a connection request for one of the resource instances 112A of the client 140 on the host device 110. The client rules component may query the client rules service to determine the client-defined rules 130 for a connection request to the respective resource instance 112A or construct 114. The client rules service may provide a decision on the connection and client-defined rules for the connection to the client rules component. If the connection is allowed, a connection to the resource instance 112A may be established. The client-defined rules 130 for the respective resource instance 112A received from the client rules service may then be applied by the client rules component to the packet flow on the connection.

Figure 1B:
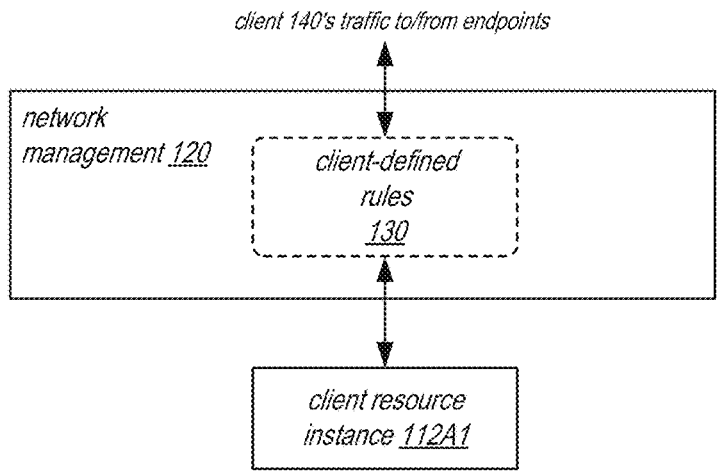
Figure 1C:
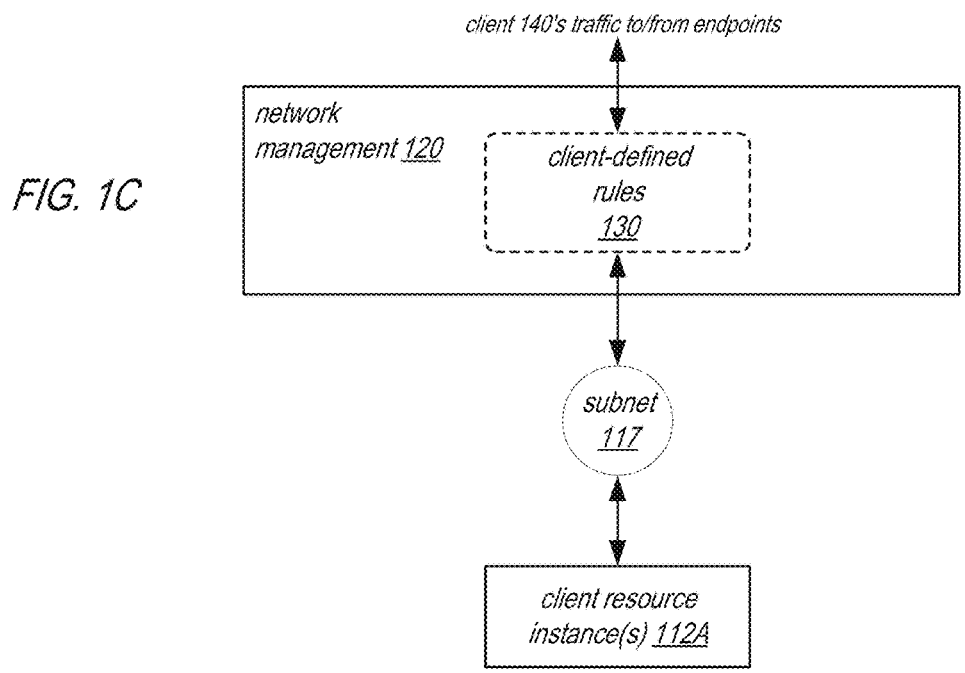
Figure 1D:
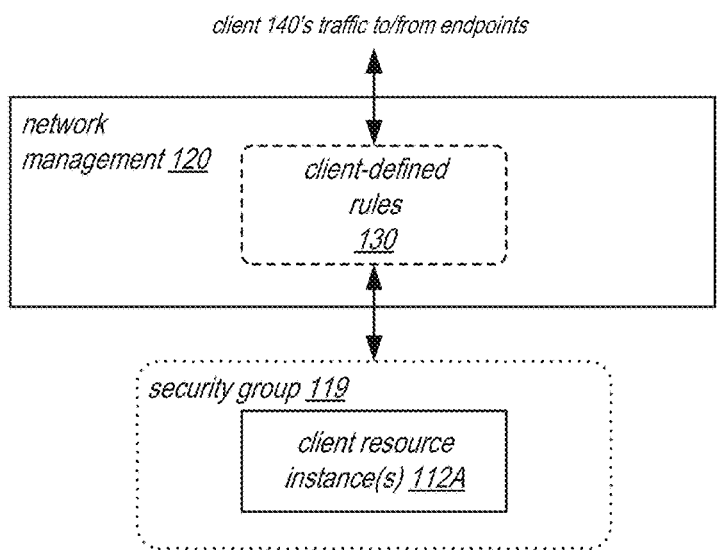

FIGS. 1B through 1D illustrate application of client-defined rules 130 for client 140's resource instances 112A and/or constructs 114 in a provider network environment, according to some embodiments. In some embodiments, the client 140 may define the same or different client-defined rules 130 for each of two or more resource instances 112A and/or constructs 114 in their implementation 116. FIG. 1B shows client-defined rules 130 applied by a network management 120 component to traffic to and from a particular resource instance 112A1. In some embodiments, the client-defined rules 130 may be applied to all of client 140's resource instances 112A, or may be applied to specific resource instances 112A or groups of resource instances 112A. FIG. 1C shows client-defined rules 130 applied by a network management 120 component to traffic to and from a particular subnet 117 that includes one or more resource instances 112A. FIG. 1D shows client-defined rules 130 applied by a network management 120 component to traffic to and from a particular security group 119 that includes one or more resource instances 112A. In some embodiments, the client-defined rules 130 may be applied to all of client 140's constructs 114 such as security groups and subnets, or may be applied to specific network constructs 114 or groups of constructs 114.

The client-defined rules 130 implemented by a client 140 may include any type of network rules that the client 140 wants or needs to apply to packets or packet flows sent from and/or to the client's network constructs 114 and resource instances 112A on their implementation 116. Client-defined rules 130 may be provided that are applied to individual packets, for example as illustrated in the systems of FIGS. 2A through 2C, and/or that are applied to packet flows on connections, for example as illustrated in the systems of FIGS. 3 and 4. In some embodiments, the rules may be defined according to a rules language and protocol specified by the service provider. In some embodiments, a markup language such as XML, may be used to define the rules, although any of a variety of other commercial or proprietary rules languages may be used. In some embodiments, a domain-specific language or meta-language may be provided for defining the rules 130 via which the client can express a wide variety of custom rules for their provider network traffic. The domain-specific language may "sandbox" the client's rules 130 to ensure compliance with provider network protocols, for example provider network encapsulation protocols, packet routing protocols, and security and isolation protocols, to ensure that the client's rules 130 not go outside the bounds of the client allocated resources including memory, bandwidth, and processor resources.

In some embodiments, a particular client-defined rule 130, when applied, performs one or more operations on or causes one or more responses to packets or packet flows identified according to an evaluation of one or more criteria indicated by or determined from packet and/or packet flow metadata. The criteria may, for example, include source and/or addresses or address ranges of packets, packet flows, or connection requests; geographical regions determined from address information; other source or destination identifiers; packet size; temporal criteria such as time of day or day of week; packet rate; and/or bandwidth, latency, or other resource usage or resource-related metrics. In some embodiments, the service or module that performs the rules evaluation to make decisions may store or have access to other information that may be used as criteria for rules. For example, the service or module may store or may have access to resource usage information, such as bandwidth usage or storage usage information for particular resource instances 112A or constructs. As another example, the service or module may store or may have access to thresholds for various resource usage.

A general, non-limiting format for a client-defined rule 130 may be given by:

IF (X) THEN (perform action Y)

where X involves one or more logical operations applied to one or more criteria, and Y is an action performed in response to X evaluating as TRUE. Actions that may be performed may include any of various operations on the packets or packet flows that are evaluated according to the rules 130. As non-limiting examples, packets may be modified, delayed, dropped, filtered rerouted to other destinations, or duplicated/copied to additional destinations; connections to particular resource instances, security groups, subnets, or endpoints may be allowed or disallowed; packet flows on connections may be throttled, dropped, or rerouted to other resource instances; and so on. The following are provided as relatively simple, non-limiting examples of client-defined rules 130, and are not intended to be limiting:

IF (source address is in IP address range aaa.bbb.ccc.ddd)
 THEN (allow connection).
IF ((source address is in IP address range aaa.bbb.ccc.ddd) AND
 (destination address is within IP address range iii.jjj.kkk.lll)
 THEN (allow connection).
IF ((destination address is in IP address range iii.jjj.kkk.lll) AND
 (time of day>22:00))
 THEN (drop packet).
IF ((source address is in IP address range aaa.bbb.ccc.ddd) OR
 (source address is within IP address range www.xxx.yyy.zzz))
 THEN (drop packet).
IF ((source OR destination is resource A) AND
 (resource A bandwidth usage>threshold))
 THEN (drop packet).
IF ((destination is resource A) AND
 (resource A processor usage>threshold))
 THEN (delay packet).
IF ((destination is resource A) AND (resource A storage usage>threshold))
 THEN (reroute to resource B).
IF (destination is resource A) THEN (reroute to resource B).
IF (destination is subnet A) THEN (copy to storage resource A).
IF (destination is security group A) THEN (send to load balancer A).

In some embodiments, the client may be allowed to define rules that may examine the content of packets or packet headers to make decisions, and that may modify the content of packets and/or packet headers. In some embodiments, a domain-specific meta-language may be provided that allows the client to express things such as locations within a packet or packet header that are to be examined and possibly modified. The meta-language may be agnostic to any particular network protocol (e.g., TCP, UDP, etc.). The following are provided as relatively simple, non-limiting examples of client-defined rules 130 that may be expressed in the domain-specific meta-language, and are not intended to be limiting:

IF (byte offset 57 of packet header=0xxx) THEN (drop packet).
IF (byte offset 100 of packet=ABC) THEN (replace with XYZ).

In some embodiments, the client-defined rules 130 that a client may implement for network constructs 114 and resource instances 112A may include custom rules that modify, remove, extend, or add to standard or default rules provided by the standard provider network functionality implemented by the network management 120 component on the host device 110. For example, the standard provider network functionality may broadly apply rules to general traffic for all clients from and to resources on the provider network 100 to provide a basic level of protection from general denial-of-service (DoS) or distributed denial-of-service (DDoS) attacks. The client 140 may implement client-defined rules 130 to detect and react to attacks that the standard provider network functionality may not detect or may not detect quickly enough, for example DoS or DDoS attacks that are directed to particular ones of the client 140's resource instances 112A or constructs 114 from particular geographic locations, address ranges, and so on. As another example, in some embodiments, when creating or modifying a security group, the client 140 may add one or more client-defined rules 130 that extend a standard or default set of security group rules that are applied by the network management 120 component on the host device 110. In some embodiments, the client may also be allowed to turn off or modify one or more of the default security group rules, or one or more other default rules applied by the standard provider network functionality of the network management 120 component.

FIG. 2A illustrates a client-defined rules module 230 that implements client-defined rules for a client's resource instances 212A on a host device 210 in a provider network environment, according to some embodiments. In some embodiments, the client-defined rules may be applied at the packet level by an executable module 230 installed in the network management 220 component of the host device 200. In some embodiments, the client-defined rules module 230 may be generated from client-defined rules code 232 provided by the client 232, for example via an interface to a provider network service 232. When processing incoming and outgoing packets, respectively, components 222 and 224 of the network management 220 component of the host device 210 may examine the packets to determine packets from or packets to the client 240's resource instances 212A on the host device 210, for example according to virtual interfaces assigned to the resource instances 212A by the provider network 200, and pass the client 240's packets to the client-defined rules 230 module for additional processing according to the client-defined rules implemented by the module 230. Other clients' incoming and outgoing traffic for resource instances 212B may be processed according to the standard provider network processing of the network management 220 component.

In some embodiments, the code 232 may be written by the client 240 according to specifications provided by the service provider, for example via a provider network service 202 implemented by one or more devices on the provider network 200. In some embodiments, the code 232 may be written in any of a variety of scripting or programming languages. In some embodiments, the service provider may provide a high-level, domain-specific programming language and environment to clients via which the client 240 may develop code 232 to implement the client-defined rules module 230. The programming language and environment may, for example, provide interfaces for defining rules and for integrating the client-defined rules with the provider network functionality. The programming language and environment may "sandbox" the client's code to ensure compliance with provider network protocols, for example provider network encapsulation protocols packet routing protocols, and security and isolation protocols, to ensure that the client 240's code 232 does not go outside the bounds of the client 240's allocated resources including memory, bandwidth, and processor resources. In some embodiments, the client 240 may compile the code 232 and provide an executable module 230 to the service provider for installation on host device 210. Alternatively, as shown in FIG. 2A, the client 240 may provide the code 232 to a service 202, and the service 202 may compile the code 232 to generate a module 230 for installation on host device 110. In some embodiments, the client-defined rules module 230 may be instantiated using virtualization technology to execute in a virtual environment as a VM or virtual process on the network management 220 component of the host device 210.

In some embodiments, alternatives to a client-defined rules 230 module compiled from code developed by the client using a compiled programming language and installed and executed on a host device 210 may be used. For example, in some embodiments, the code may be developed in an interpreted language and provided to the service provider by the client. An interpreter component or engine on the host device 210 or elsewhere on the provider network may then execute the code directly. As another example, in some embodiments, the code may be developed in a language that is directly executable on dedicated machine architecture for executing client-defined rules and provided to the service provider by the client. An instance of the dedicated machine architecture on the host device 210 or elsewhere on the provider network may then execute the code directly.

FIG. 2B illustrates a client-defined rules module 230 implemented within host system processing 214 on a host device 210 in a provider network environment, according to some embodiments. In some embodiments, a host device 210 may implement the network management 220 component as part of general host system processing 214, as shown in FIG. 2B. For example, in some embodiments, the VMM that manages the VMs in a virtualized environment on the host device 210 including VMs that implement client 240's resource instances 212A may include a network processing 220 component that implements provider network packet processing functionality, and that includes the client-defined rules module 230 for the client 240's resource instances 212A on the host device 210. In some embodiments, the client-defined rules 230 module may be instantiated in host system processing 214 using virtualization technology to execute in a virtual environment as a virtual machine (VM) or virtual process on the network management 220 component of the host device 210.

FIG. 2C illustrates a client-defined rules module 230 implemented by a network processing device 216 on a host device 210 in a provider network environment, according to some embodiments. In some embodiments, as an alternative to host system processing 214 implementing the network management 220 component on the host device 210, the host device 210 may include or may be coupled to one or more network processing devices 222 that process network traffic (e.g., packet flows) between the resource instances 212 on the host device 210 and the provider network. The network processing devices 222 implement at least part of the provider network packet processing functionality on the host device 210. Collectively, the network processing device(s) 222 form the network management 220 component of the host device 210, as shown in FIG. 2C. As a non-limiting example, a network processing device 222 may be a Peripheral Component Interconnect (PCI) device plugged into a PCI expansion slot or PCI bus of the host device. A network processing device 222 may, for example, connect to a host I/O interface (e.g., a PCI bus) on the host device 210, and may receive client packets from and send client packets to VMs executing on the host device 210 via the host I/O interface. A network processing device 222 may also include one or more network ports connected to the provider network, and may receive provider network packets from and send provider network packets onto the provider network via the port(s). A network processing device 222 may also include, but is not limited to, one or more processors (e.g., multicore processor(s)), a memory, and an internal I/O interface. The processor(s) may be custom or proprietary processors, or alternatively may be general-purpose processors. At least one of the network processing device(s) 222 may include an instance of the client-defined rules module 230 for the client 240's resource instances 212A on the host device 210, as shown in FIG. 2C. In some embodiments, the client-defined rules 230 module may be instantiated in a network processing device 222 using virtualization technology to execute in a virtual environment as a VM or virtual process on the network processing device 222.

In some embodiments, as an alternative to a client-defined rules 230 module installed in the network processing 220 component of a host device 210 that implements the client-defined rules for a client 240's resources at the packet level on the host device 210, the client-defined rules may instead be applied at the connection or flow level according to a set of rules provided by the client 240 and applied by a client rules component and client rules service, for example as illustrated in FIGS. 3 and 4. The client rules component may be implemented on the host device, for example as a module of the network management component as illustrated in FIGS. 3 and 4. The client rules service may be implemented on the provider network external to the host device as illustrated in FIG. 3, or alternatively may be implemented by one or more of the client's resource instances on the host device as illustrated in FIG. 4. Applying the client-defined rules at the connection or flow level allows a client-defined rules-based decision to be made once for a connection to a resource instance or construct by a client rules service external to the network management component of the host device. The decision and applicable rules are then applied to the packet flow on the connection by the client rules component of the network management component on the host device. Thus, the network management component does not have to make a client-defined rules-based decision for each packet in data flows over connections to the resource instances or constructs; instead, the network management component queries the client rules service to determine the rules to apply to all packets in the data flows on the connections.

While FIGS. 2A through 2C illustrate a client-defined rules module 230 instantiated in the network management 220 component of a host device 210, in some embodiments client-defined rules modules 230 may be implemented by network components on the provider network 200 that process network traffic between endpoints and host device(s) 210, for example by provider network routers, switches, or load balancers. A client-defined rules module 230 implemented on a network device may apply the rules defined by the module 230 to the respective client's incoming and/or outgoing network traffic.

FIG. 3 illustrates a client rules service 350 external to a host device 310 in a provider network environment that determines client-defined rules 330 for packet flows to a client's resource instances 312 on the host device 310 based on input from a client rules component 356 on the host device 310, according to some embodiments. In some embodiments, the client rules component 354 may be implemented on the host device 310, for example as a module of the network management 320 component. In some embodiments, the client rules service 350 may be implemented by one or more devices on the provider network 300 external to the host device 310 as illustrated in FIG. 3.

In some embodiments, when creating a new or modifying an existing resource instance 312A or construct 314 such as a security group or subnet, the client 340 may be allowed to define 332 client-defined rules 330 for the resource instance 312A or construct 314, for example by providing a rules file such as a markup language file or other structure that includes the client-defined rules 330, or by defining the rules 330 using an interface to a provider network service 302 implemented by one or more devices on the provider network 300. For example, in some embodiments, when creating or modifying a security group or other construct 314 via a provider network service 302, the client may define a set of custom rules for their security group or other construct that replace, extend, or modify standard or default rules for security groups or other constructs. In some embodiments, a set of custom rules, or templates for custom rules, that replace, extend, or modify standard or default rules may be displayed on an interface to a service, and the client may be allowed to select or define the custom rules that they want to add for their security group or other construct via the interface. The provider network service 302 may provide the client-defined rules 330 to the client rules service 350 on the provider network 300. In some embodiments, the provider network service 302 and the client rules service 350 may be implemented as separate services as shown in FIG. 3, or alternatively may be implemented as a single service.

In some embodiments, to apply the client-defined rules 330 to the packet flows, the network management 320 component may receive a connection request for one of the resource instances 312A of the client 340 on the host device 310. The client rules component 354 may query the client rules service 350 to determine the particular client-defined rules 330 for a connection request to the respective resource instance 312A or construct 214. The client rules service 350 may provide a decision on the connection and client-defined rules for the connection to the client rules component 354. If the connection is allowed, a connection to the resource instance 312A may be established. The client-defined rules 330 for the respective resource instance 312A received from the client rules service 350 may then be applied by the client rules component 354 to the packet flow on the connection. For example, as shown in FIG. 3, when processing incoming and outgoing packets, respectively, components 322 and 324 of the network management 320 component of the host device 310 may route packets in packet flows on connections to the client 340's resource instances 312A on the host device 310 to the client rules component 354 so that the client rules component 354 can apply the predetermined client-defined rules 330 for the connections to the packet flows. Other clients' incoming and outgoing packet flows for resource instances 312B may be processed according to the standard provider network processing of the network management 320 component.

FIG. 4 illustrates a client rules service 450 implemented on a client's resource instance 412A1 on a host device 410 in a provider network environment that determines client-defined rules 430 for packet flows to the client's resource instance(s) 412A2 on the host device 410 based on input from a client rules component 456 on the host device 410, according to some embodiments. In some embodiments, the client rules component 454 may be implemented on the host device 410, for example as a module of the network management 420 component. In some embodiments, the client rules service 450 may be implemented by one or more of the client's resource instances 412A1 on the host device 410 as illustrated in FIG. 4.

In some embodiments, when creating a new or modifying an existing resource instance 412A2 or construct 414 such as a security group or subnet, the client 440 may be allowed to define 432 rules 430 for the resource instance 412A2 or construct 414, for example by providing a rules file such as a markup language file or other structure that includes the client-defined rules 430, or by defining the rules 430 using an interface to a provider network service 402 implemented by one or more devices on the provider network 400. The provider network service 402 may provide the client-defined rules 430 to the client rules service 450 on the provider network 400.

In some embodiments, to apply the client-defined rules 430 to the packet flows, the network management 420 component may receive a connection request for one of the resource instances 412A2 of the client 440 on the host device 410. The client rules component 454 may query the client rules service 450 on the client resource instance 412A1 to determine the particular client-defined rules 430 for a connection request to the respective resource instance 412A2 or construct 414. The client rules service 450 may provide a decision on the connection and client-defined rules for the connection to the client rules component 454. If the connection is allowed, a connection to the resource instance 412A2 may be established. The client-defined rules 430 for the respective resource instance 412A received from the client rules service 450 may then be applied by the client rules component 454 to the packet flow on the connection. For example, as shown in FIG. 4, when processing incoming and outgoing packets, respectively, components 422 and 424 of the network management 420 component of the host device 410 may route packets in packet flows on connections to the client 440's resource instances 412A2 on the host device 410 to the client rules component 454 so that the client rules component 454 can apply the predetermined client-defined rules 430 for the connections to the packet flows. Other clients' incoming and outgoing packet flows for resource instances 412B may be processed according to the standard provider network processing of the network management 420 component.

While FIGS. 3 and 4 illustrate a client rules component instantiated in the network management component of a host device, in some embodiments client rules components may be implemented by network components on the provider network that process network traffic between endpoints and host device(s), for example by provider network routers, switches, or load balancers. A client rules component implemented on a network device may query a client rules service to obtain decisions for packet flows and rules for the packet flows to respective clients' resource instances or constructs.

Figure 5A:
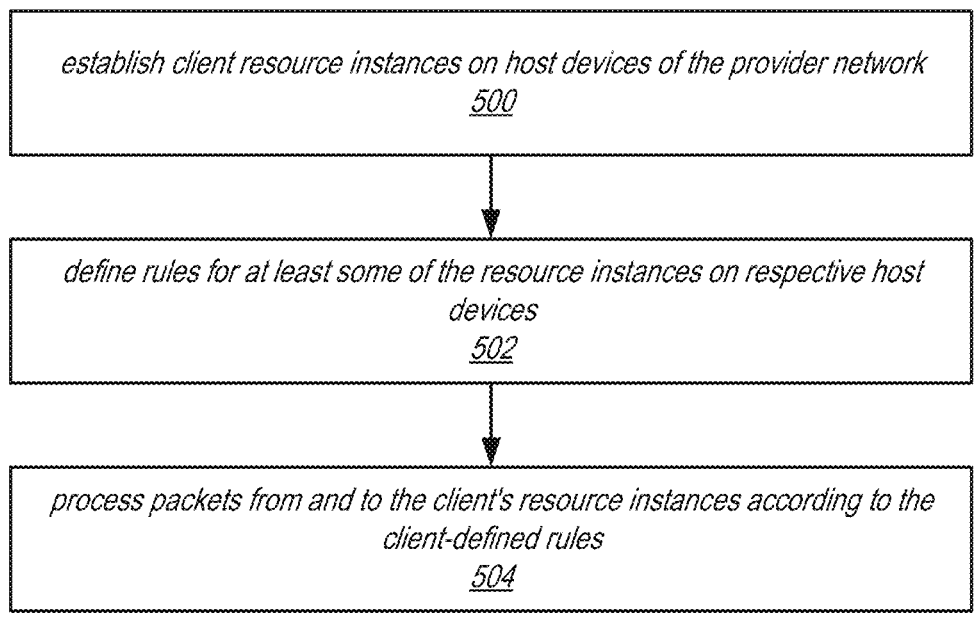
FIG. 5A illustrates an example high-level method for implementing and applying client-defined rules for a client's resource instances in a provider network environment, according to some embodiments.

FIG. 5A illustrates an example high-level method for implementing and applying client-defined rules for a client's resource instances in a provider network environment, according to some embodiments. The method of FIG. 5A may, for example, be implemented in provider network environments as illustrated in FIGS. 1A through 4.

Figure 8:
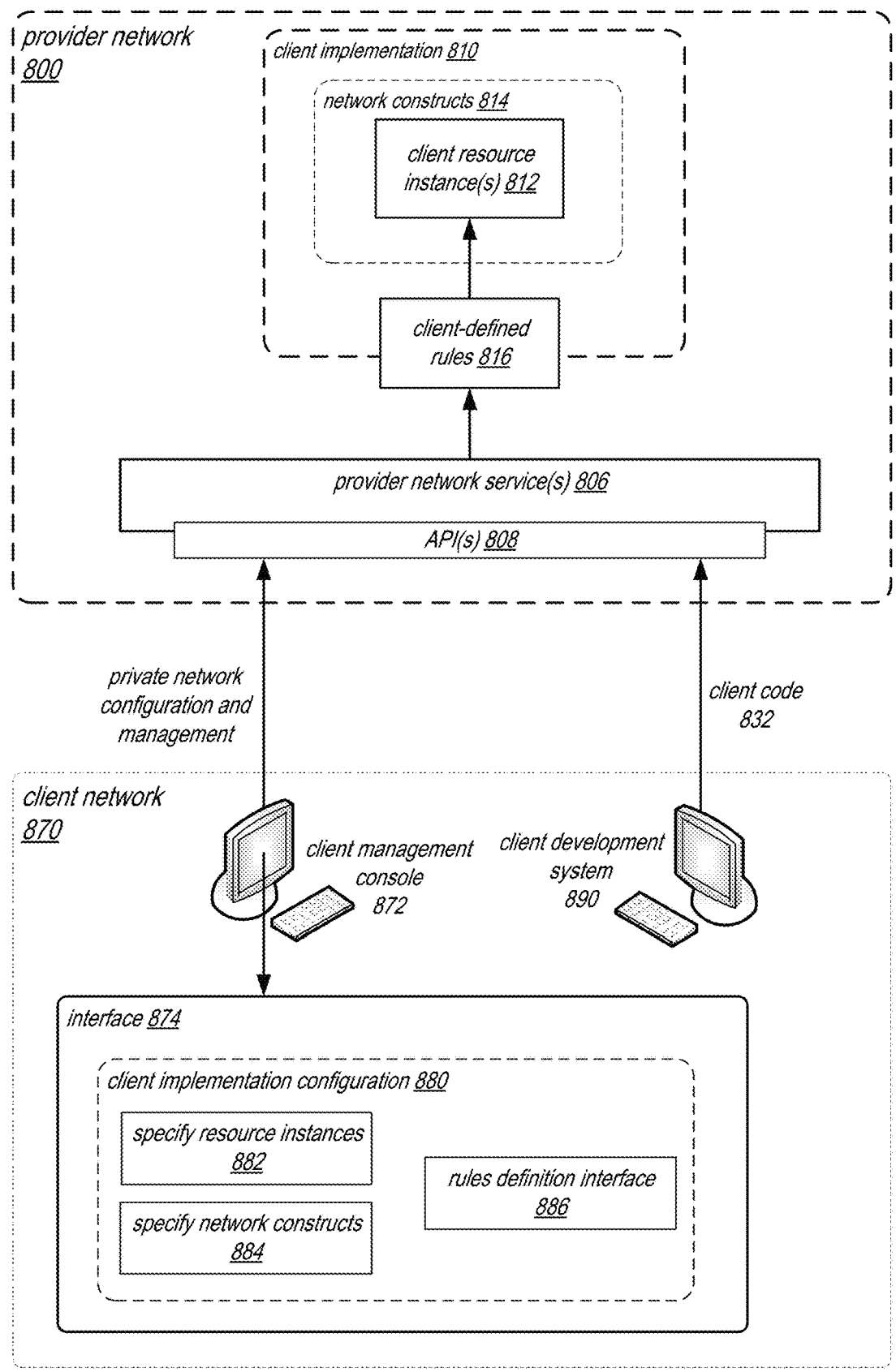
FIG. 8 illustrates provider network services and application programming interfaces (APIs) that may be used to establish client-defined rules for clients' resources on a provider network, according to some embodiments.

As indicated at 500 of FIG. 5A, a client may establish client resource instances on host devices of the provider network. For example, the client may provision or establish one or more virtual machines (VMs) on a host device as client resource instances for their implementation (e.g., private network) on the provider network. For example, a client may provision resource instances for an implementation via APIs to one or more provider network services as illustrated in FIG. 8.

Figure 5B:
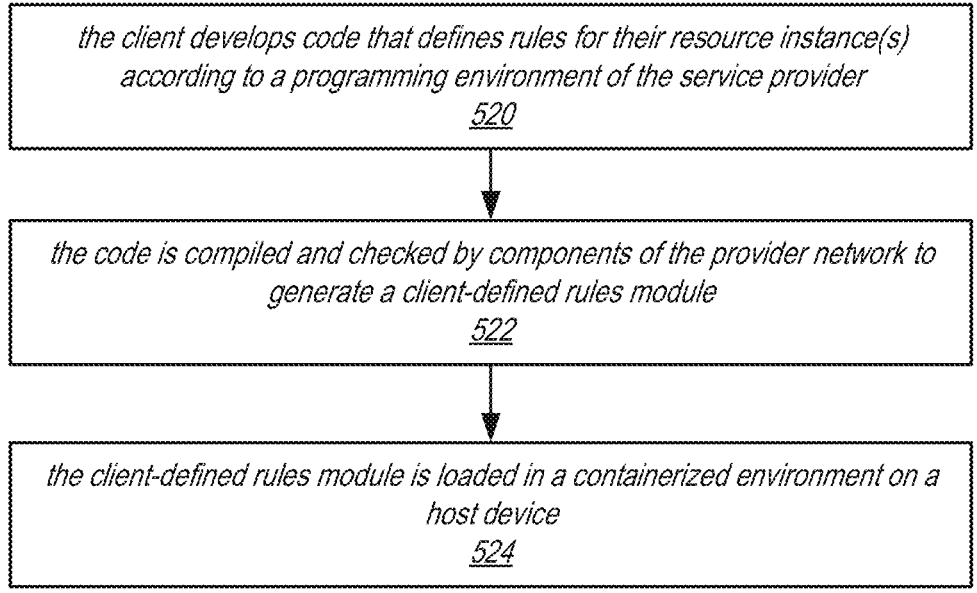
FIG. 5B illustrates an example high-level method for implementing a client-defined rules module for a client's resource instances in a provider network environment, according to some embodiments.
Figure 5C:
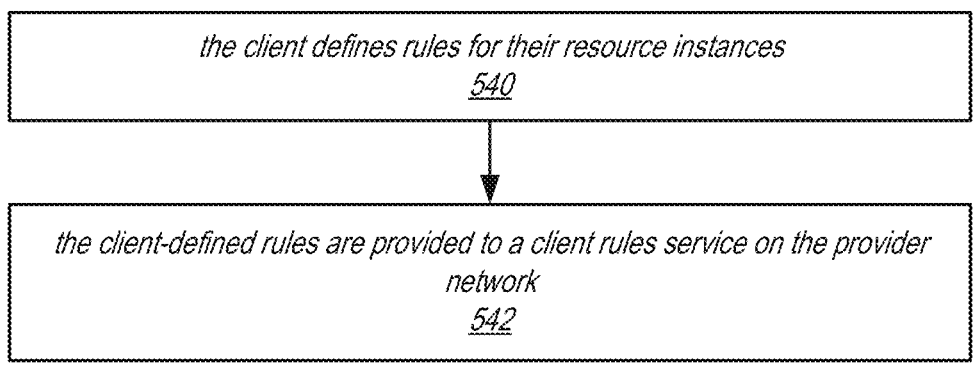
FIG. 5C illustrates an example high-level method for defining rules for a client's resource instances in a provider network environment, according to some embodiments.

As indicated at 502 of FIG. 5A, the client may define rules for at least some of the resource instances on respective host devices. For example, in some embodiments, the client may implement a client-defined rules module for the client's resource instances in the provider network environment as illustrated in FIG. 5B. Alternatively, in some embodiments, the client may define rules for connections and packet flows to the client's resource instances in the provider network environment as illustrated in FIG. 5C.

Figure 6A:
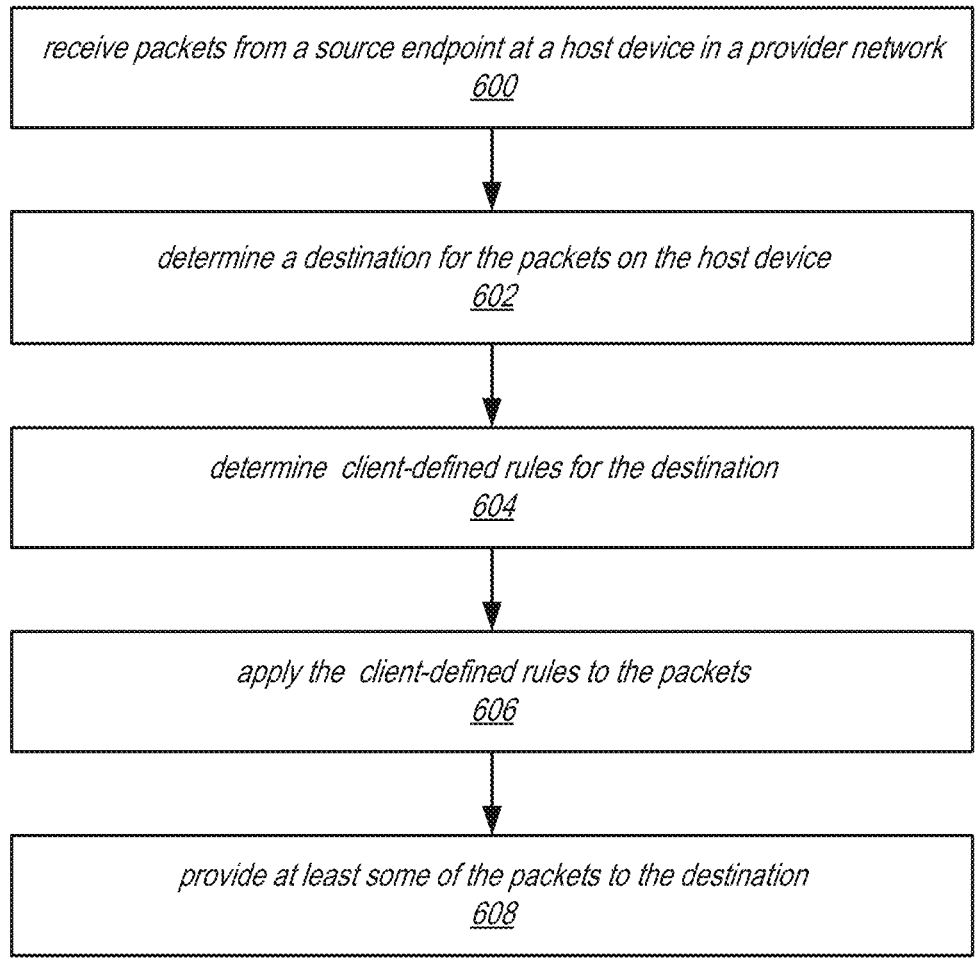
FIG. 6A illustrates an example method for applying client-defined rules to incoming packets for a client's resource instances in a provider network environment, according to some embodiments.
Figure 6B:
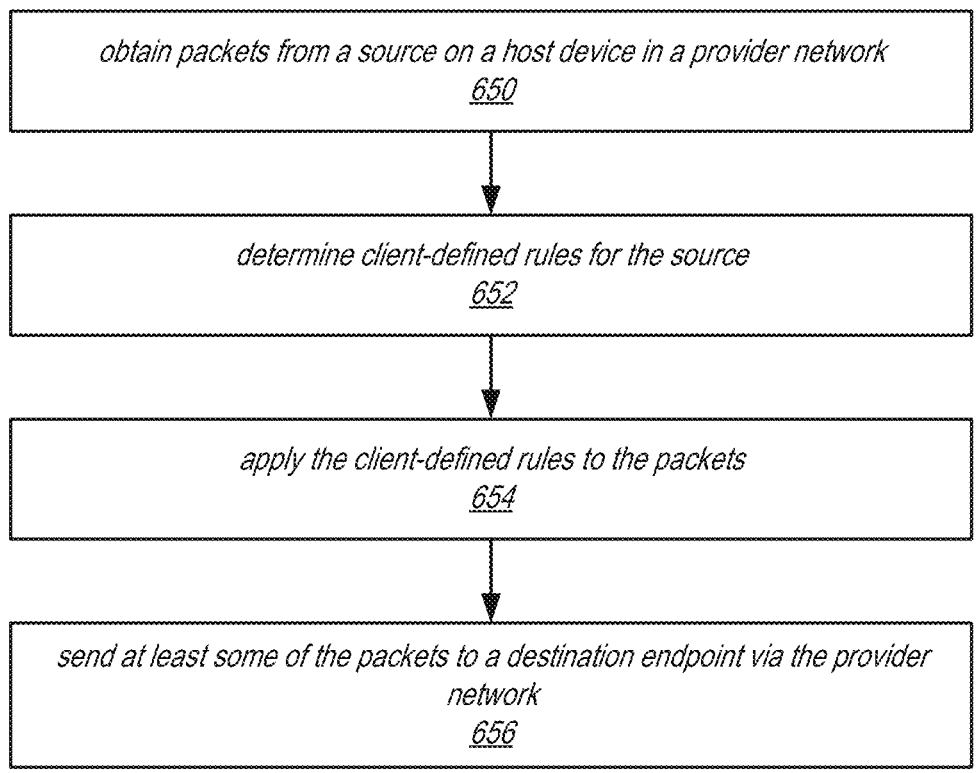
FIG. 6B illustrates an example method for applying client-defined rules to outgoing packets from a client's resource instances in a provider network environment, according to some embodiments.
Figure 7:
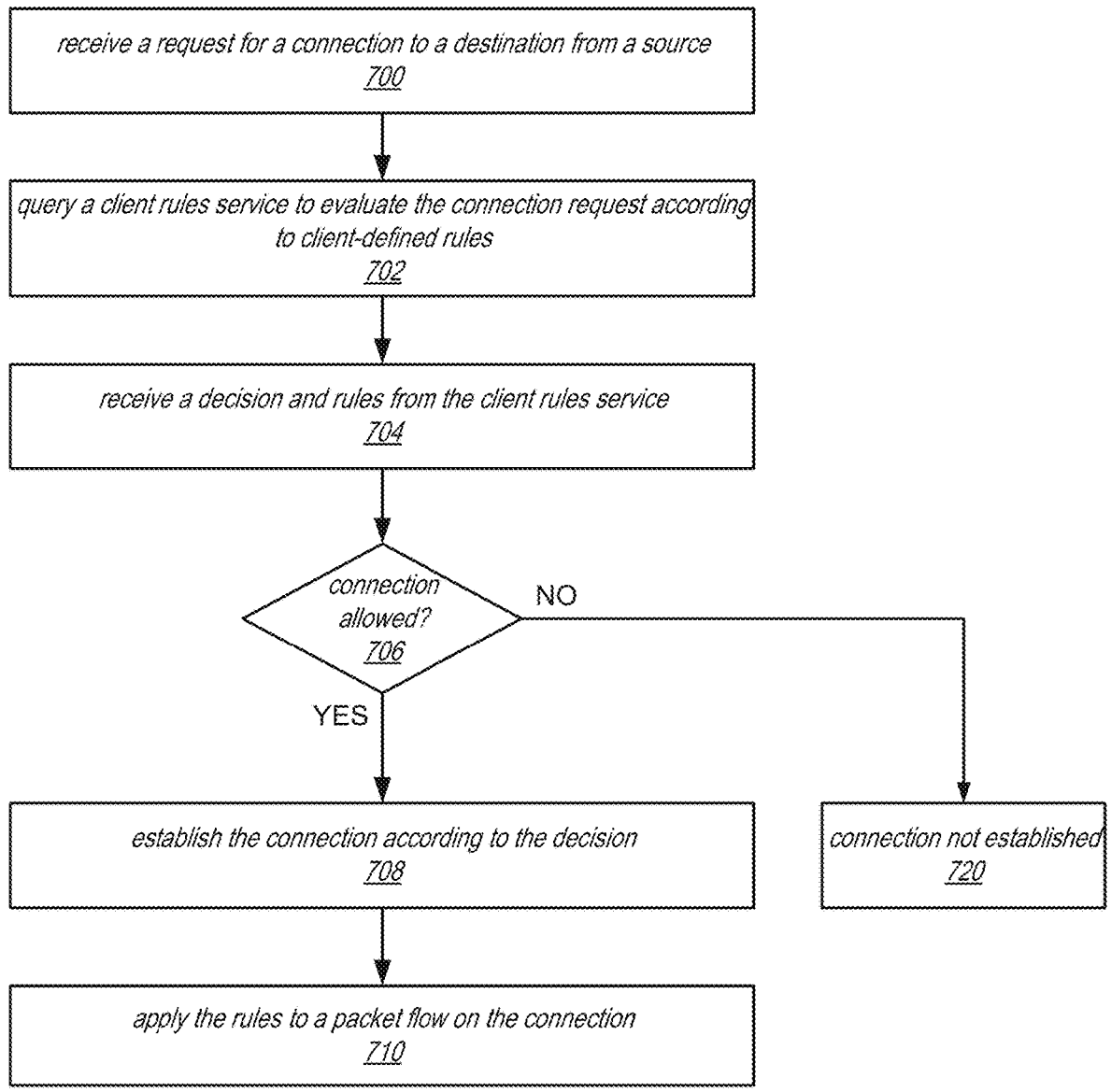
FIG. 7 illustrates an example method for applying client-defined rules to connections and packet flows to and from a client's resource instances in a provider network environment, according to some embodiments.

As indicated at 504 of FIG. 5A, packets from and to the client's resource instances may be processed according to the client-defined rules. FIG. 6A illustrates an example method for applying client-defined rules to incoming packets for a client's resource instances in a provider network environment that may be used at element 504 in some embodiments. FIG. 6B illustrates an example method for applying client-defined rules to outgoing packets from a client's resource instances in a provider network environment that may be used at element 504 in some embodiments. FIG. 7 illustrates an example method for applying client-defined rules to connections and packet flows to and from a client's resource instances in a provider network environment that may be used at element 504 in some embodiments.

FIG. 5B illustrates an example high-level method for implementing a client-defined rules module for a client's resource instances in a provider network environment, according to some embodiments. The method of FIG. 5B may, for example, be implemented at element 502 of 5A. In some embodiments, the client-defined rules may be applied at the packet level by an executable module installed in the network management component of the host device, for example as illustrated in FIGS. 2A through 2C.

As indicated at 520 of FIG. 5B, a client may develop code that implements client-defined rules for their resource instance(s) according to a programming environment of the service provider. In some embodiments, the client may develop and provide software code that implements the client-defined rules, for example using a client development system as illustrated in FIG. 8. In some embodiments, the code may be written by the client according to specifications, programming languages, and/or development tools provided by the service provider.

As indicated at 522 of FIG. 5B, the code may be compiled and checked by components of the provider network to generate a client-defined rules module. In some embodiments, the client may provide the code that implements the client-defined rules to the service provider, for example via an API to a provider network service as illustrated in FIG. 8, and the service provider may compile the code for installation on the host device(s). Alternatively, in some embodiments, the client may compile the code and provide an executable module to the service provider, for example via an API to a provider network service as illustrated in FIG. 8, for installation on host devices that implement the client's resource instance(s). In some embodiments, alternatives to a client-defined rules module compiled from code developed by the client using a compiled programming language and installed and executed on a host device may be used. For example, in some embodiments, the code may be developed in an interpreted language and provided to the service provider by the client. An interpreter component or engine on the host device or elsewhere on the provider network may then execute the code directly. As another example, in some embodiments, the code may be developed in a language that is directly executable on dedicated machine architecture for executing client-defined rules and provided to the service provider by the client. An instance of the dedicated machine architecture on the host device or elsewhere on the provider network may then execute the code directly.

As indicated at 524 of FIG. 5B, the client-defined rules module may be loaded in a containerized environment on a host device. In some embodiments, a host device may implement a network management component as part of general host system processing, as shown in FIG. 2B, and the client-defined rules module may be loaded in the network management component. In some embodiments, the client-defined rules module may be instantiated in host system processing using virtualization technology to execute in a virtual environment as a VM or virtual process on the network management component of the host device. In some embodiments, as an alternative to host system processing implementing the network management component on the host device, the host device may include or may be coupled to one or more network processing devices that process network traffic (e.g., packet flows) between the resource instances on the host device and the provider network, as shown in FIG. 2C. Collectively, the network processing device(s) form the network management component of the host device. At least one of the network processing device(s) may include an instance of the client-defined rules module, as shown in FIG. 2C. In some embodiments, the client-defined rules module may be instantiated in a network processing device using virtualization technology to execute in a virtual environment as a VM or virtual process on the network processing device.

FIG. 5C illustrates an example high-level method for defining rules for a client's resource instances in a provider network environment, according to some embodiments. The method of FIG. 5C may, for example, be implemented at element 502 of 5A. In some embodiments, as an alternative to a client-defined rules module installed in the network processing component of a host device that implements the client-defined rules for a client's resources at the packet level on the host device as illustrated in FIG. 5B, the client-defined rules may instead be applied at the connection or flow level according to a set of rules defined by the client and applied by a client rules component and client rules service, for example as illustrated in FIGS. 3 and 4.

As indicated at 540 of FIG. 5C, the client may define rules for their resource instances. For example, in some embodiments, when creating a new or modifying an existing resource instance or construct such as a security group or subnet, the client may be allowed to define rules for the resource instance or construct, for example by providing a rules file such as a markup language file or other structure that includes the client-defined rules, or by defining the rules using an interface to a provider network service implemented by one or more devices on the provider network as shown in FIG. 8. For example, in some embodiments, when creating or modifying a security group, the client may define a set of custom rules for their security group that replace, extend, or modify standard or default security group rules. In some embodiments, a set of custom rules, or templates for custom rules, that replace, extend, or modify standard or default rules may be displayed on an interface to a service, and the client may be allowed to select or define the custom rules that they want to add for their security group via the interface.

As indicated at 542 of FIG. 5C, the client-defined rules are provided to a client rules service on the provider network. The client rules service may be implemented on the provider network external to the host device as illustrated in FIG. 3, or alternatively may be implemented by one or more of the client's resource instances on the host device as illustrated in FIG. 4.

FIG. 6A illustrates an example method for applying client-defined rules to incoming packets for a client's resource instances in a provider network environment, according to some embodiments. The method of FIG. 6A may, for example, be implemented at element 504 of 5A. In FIG. 6A, the source is an endpoint on an external network, and the destination is a client resource instance or network construct such as a security group or subnet on the host device in the provider network. As indicated at 600 of FIG. 6A, packets from a source endpoint may be received at a host device in a provider network. As indicated at 602 of FIG. 6A, a destination resource instance or network construct may be determined for the packets on the host device, for example from metadata in the packets headers.

As indicated at 604 of FIG. 6A, client-defined rules may be determined for the destination resource instance or construct. As indicated at 606 of FIG. 6A, the client-defined rules for the resource instance or construct may be applied to the packets. For example, in some embodiments, a component on the host device may determine that the packets are targeted at a resource instance or network construct of a client that has provided a client-defined rules module that is instantiated in the network management component of the host device, and may pass the packets to the module. The client-defined rules module then determines and applies rules for the packets as illustrated in FIG. 2A. As indicated at 608 of FIG. 6A, at least some of the packets may be provided to the destination resource instance or construct on the host device.

FIG. 6B illustrates an example method for applying client-defined rules to outgoing packets from a client's resource instances in a provider network environment, according to some embodiments. The method of FIG. 6B may, for example, be implemented at element 504 of 5A. In FIG. 6B, the source is a client resource instance or network construct on a host device of the provider network, and the destination is an endpoint on an external network or on the provider network.

As indicated at 650 of FIG. 6B, packets may be obtained from a resource instance or network construct on a host device in a provider network. As indicated at 652 of FIG. 6B, client-defined rules may be determined for the resource instance. As indicated at 654 of FIG. 6B, the client-defined rules may be applied to the packets. For example, in some embodiments, a component on the host device may determine that the packets are from a resource instance or network construct of a client that has provided a client-defined rules module that is instantiated in the network management component of the host device, and may pass the packets to the module. The client-defined rules module then determines and applies rules for the packets as illustrated in FIG. 2A. As indicated at 656 of FIG. 6B, at least some of the packets may be sent to a destination endpoint via the provider network.

FIG. 7 illustrates an example method for applying client-defined rules to connections and packet flows to and from a client's resource instances in a provider network environment, according to some embodiments. The method of FIG. 7 may, for example, be implemented at element 504 of 5A.

In FIG. 7, the source may, for example, be an endpoint on an external network or on the provider network, and the destination may be a client resource instance or construct on a host device of the provider network. Alternatively, the source may be a client resource instance on a host device of the provider network, and the destination may be an endpoint on an external network or on the provider network.

As indicated at 700 of FIG. 7, a request for a connection to a destination may be received at a host device from a source. As indicated at 702 of FIG. 7, a client rules service may be queried to evaluate the connection request according to client-defined rules. For example a client rules component on the host device may query the service, as illustrated in FIGS. 3 and 4. The client rules service may be implemented on the provider network external to the host device as illustrated in FIG. 3, or alternatively may be implemented by one or more of the client's resource instances on the host device as illustrated in FIG. 4. The client rules service may evaluate the query request according to the client-defined rules to make a decision for the connection request, for example whether to allow or deny the connection, to reroute the connection to another resource instance, and so on. In addition, the client rules service may determine client-defined rules to be applied to the connection, if allowed, for example rules for resource limits on the connection (e.g., time limits, bandwidth limits, storage limits, computation limits, etc.). In addition, the client rules service may determine client-defined rules to be applied to packets on the connection. As a non-limiting example, a rule may be provided that modifies the header of each incoming packet on the connection, or that examines a location in each packet header and performs some action on the packet based on content of the location. As indicated at 704 of FIG. 7, the client rules component may receive a decision and client-defined rules for the connection and/or for packets on the connection from the client rules service. At 706, if the connection is allowed as indicated by the decision, then the connection may be established according to the decision as indicated at 708 of FIG. 7. As indicated at 710 of FIG. 7, the client-defined rules for the connection and/or for packets on the connection that were received from the client rules service may be applied to a packet flow on the connection. At 706, if the connection is not allowed as indicated by the decision, then a connection is not established as indicated at 720 of FIG. 7.

Figure 12:
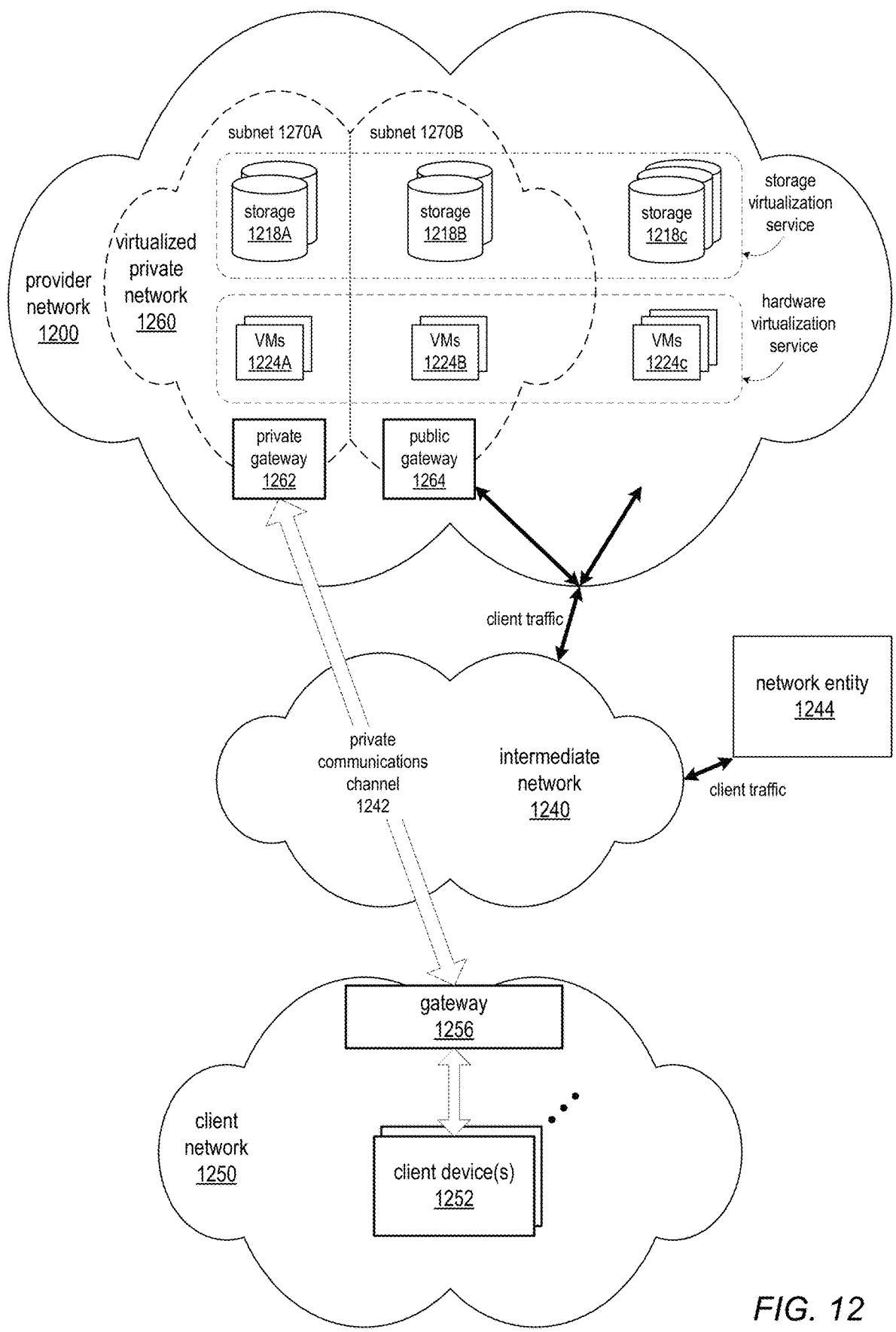
FIG. 12 illustrates an example provider network that provides virtualized private networks to at least some clients, according to some embodiments.
Figure 13:
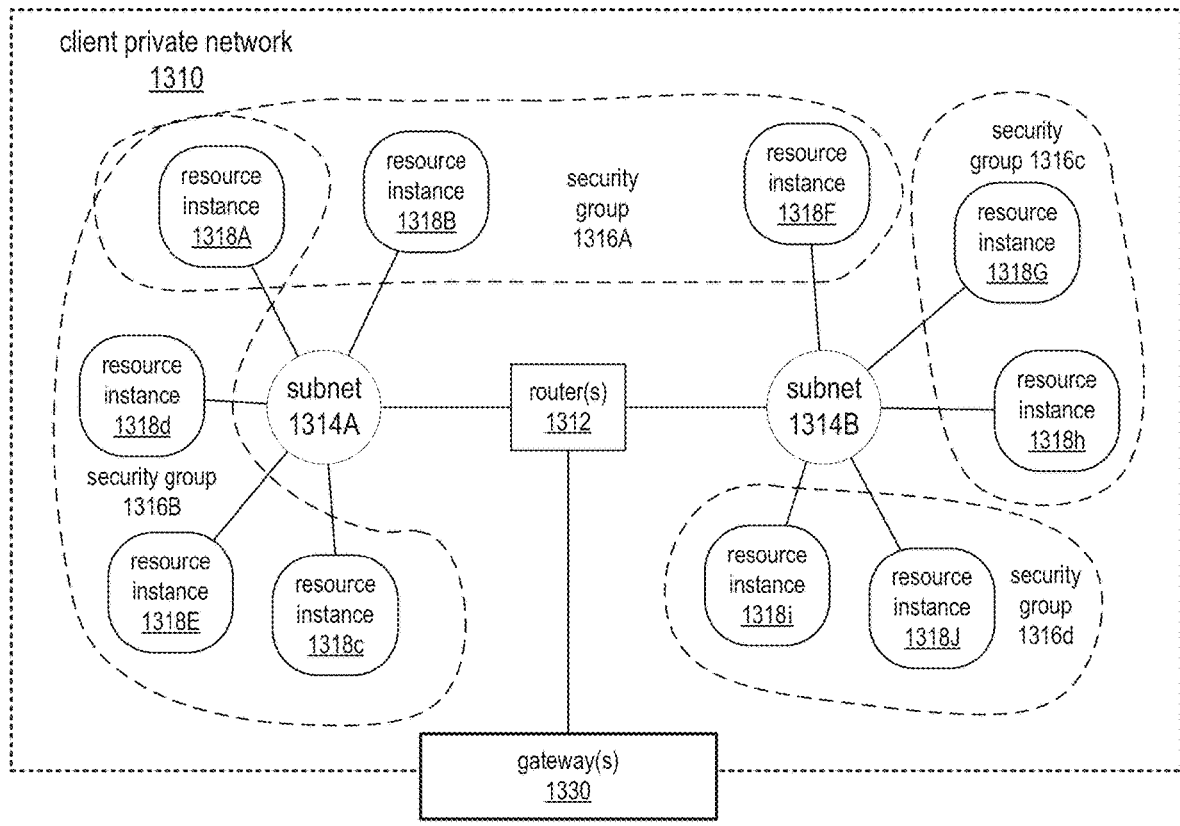
FIG. 13 illustrates subnets and security groups in an example virtual private network implementation on a provider network, according to some embodiments.

FIG. 8 illustrates provider network services and application programming interfaces (APIs) that may be used to establish client-defined rules for clients' resources on a provider network, according to some embodiments. In some embodiments, a service provider that provides a provider network 800 may provide one or more provider network services 806 and one or more application programming interfaces (API(s)) 808 to the services 806 that allow clients (e.g., a private network manager using a management console 872 on a client network 870) to provision, configure, manage, and view client implementations 810 such as private networks including client resource instances 812 and constructs 814 such as security groups and subnets as described herein. For example, in some embodiments, a client network manager may establish and manage network constructs 814 and access control for a private network implementation 810, including but not limited access control rules, security groups, and subnets, as shown in FIGS. 12 and 13, via the services 806 and APIs 808. The APIs 808 and services 806 may allow the manager to specify access control and network constructs 814 for the private network implementation 810, specify resource instances 812, include the resource(s) 812 in security groups and/or on subnets in the private network implementation 810, and otherwise configure, view, and manage the private network implementation 810. In some embodiments, the service provider that provides the provider network 800 may charge clients for resource usage (e.g., computation and storage resource usage), bandwidth usage, and other types of network usage on the implementation 810.

In some embodiments, the provider network service(s) 806 and APIs 808 may be used to define rules 816 for their implementations 810, constructs 814, and/or resource instances 812 on the provider network 800 as illustrated in FIGS. 1 through 7. A client associated with client network 870 may, for example, establish, provision, and manage a client implementation 810 such as a private network on the provider network 800 via one or more services 806 of the provider network 800 accessed through a management console 872 on client network 870. For example, the client may access API(s) 808 of one or more services 806 via the management console 872 to implement resource instances 812 and constructs 814 in the client implementation 810, and to define rules 816 for the constructs 814 and/or resource instances 812, as described in reference to FIGS. 1 through 7. In some embodiments, the API(s) 808 may display an interface 874 on console 872 that provides one or more graphical and/or textual interface elements that allow the client to view, create, provision, and manage the client's implementation 810 including the client's resource instances 812, associated network constructs 814 such as security groups and subnets, and to define rules 816 for the implementation 810, constructs 814 and/or resource instances 812.

FIG. 8 shows a non-limiting example of a graphical and/or textual interface 874 that may be displayed on a client's console 872 in some embodiments. The interface 874 may, for example, show a graphical and/or textual representation 880 of the configuration or topology of the client's implementation 810. Graphical and/or textual representations of one or more resource instances 812 and network constructs 814 in the implementation 810 may be displayed. Graphical and/or textual representations of network elements (load balancers, routers, connections, etc.), security and access control components or elements (e.g., security groups and subnets as illustrated in FIGS. 12 and 13), and other components or constructs may also be displayed. Graphical and/or textual representations of the client-defined rules 816 for the implementation 810, constructs 814 and/or resource instances 812 may also be displayed.

The client may, for example, use a cursor control device to select various interface elements provided by interface 874 to, for example, create and provision an implementation 810 such as a private network, create, manage, and modify constructs 814 such as security groups and subnets for the implementation 810, create and manage resource instances 812 in the implementation 810, and to define rules 816 for the implementation 810, constructs 814 and/or resource instances 812. The interface 874 may include other user interface elements, for example menus or other elements that allow the client to select from among various ones of the client's implementations 810, elements to select, create, configure, and manage resource instances 812 within the implementation(s) 810, elements for defining and associating client-defined rules with resource instances 812 or associated network constructs 814 such as security groups and subnets in the implementation(s) 810, and so on.

In some embodiments, the interface 874 may include one or more user interface elements 882 via which the client may specify or select resource instances 812 for an implementation 810, one or more user interface elements 884 via which the client may specify or select constructs 814 for the implementation 810, and a rules definition interface 886 including one or more user interface elements via which the client may define rules 816 for the implementation 810, constructs 814 and/or resource instances 812. For example, in some embodiments, when creating a new or modifying an existing resource instance 812 or construct 814 such as a security group or subnet, the client may be allowed to define rules 816 for the resource instance 812 or construct 814, for example by providing a rules file (e.g., a markup language file) or other structure that includes the rules, or by defining the rules, for example according to a rules definition language or rules format provided via the rules definition interface 886. For example, in some embodiments, when creating or modifying a security group, the client may define a set of custom rules for their security group that replace, extend, or modify standard or default security group rules. In some embodiments, a set of custom rules, or templates for custom rules, that replace, extend, or modify standard or default rules may be displayed on interface 886, and the client may be allowed to select or define the custom rules that they want to add for their security group via the interface 886.

In some embodiments, as an alternative to defining rules 816 for their implementation 810, resource instances 812 or constructs 814 via the interface 874 or providing a rules file or other structure that defines the rules, the client may develop and provide software code that implements the client-defined rules 816, for example using a client development system 890 as illustrated in FIG. 8. In some embodiments, the code may be written by the client according to specifications, programming or scripting languages, and/or development tools provided by the service provider, for example via an API 808 to a provider network service 806. In some embodiments, the client may compile the code and provide an executable module to the service provider, for example via an API 808 to a provider network service 806, for installation on host devices that implement the client's resource instance(s) 812. Alternatively, the client may provide the code to the service provider, for example via an API 808 to a provider network service 806, and the service provider may compile the code to generate a module for installation on the host device(s). In some embodiments, alternatives to a client-defined rules module compiled from code developed by the client using a compiled programming language and installed and executed on a host device may be used. For example, in some embodiments, the code may be developed in an interpreted language and provided to the service provider by the client. An interpreter component or engine on the host device or elsewhere on the provider network may then execute the code directly. As another example, in some embodiments, the code may be developed in a language that is directly executable on dedicated machine architecture for executing client-defined rules and provided to the service provider by the client. An instance of the dedicated machine architecture on the host device or elsewhere on the provider network may then execute the code directly.

In some embodiments, instead of or in addition to providing access to APIs 808 via a graphical interface 874 on console 872, a provider network 800 may provide a command line interface (CLI) to the provider network services 806 via which the client may manage their private network 810. For example, in some embodiments, the client may create and manage an implementations 810, constructs 814, and/or resource instances 812 via CLI commands, and may define or otherwise provide client-defined rules 816 for the implementation 810 and for resources 812 and constructs 814 within the implementation 810 via CLI commands.

Example Provider Network Environments

This section describes example provider network environments in which embodiments of the methods and apparatus for providing client-defined rules for clients' resources in provider network environments as described in reference to FIGS. 1 through 8 may be implemented. However, these example provider network environments are not intended to be limiting.

Figure 9:
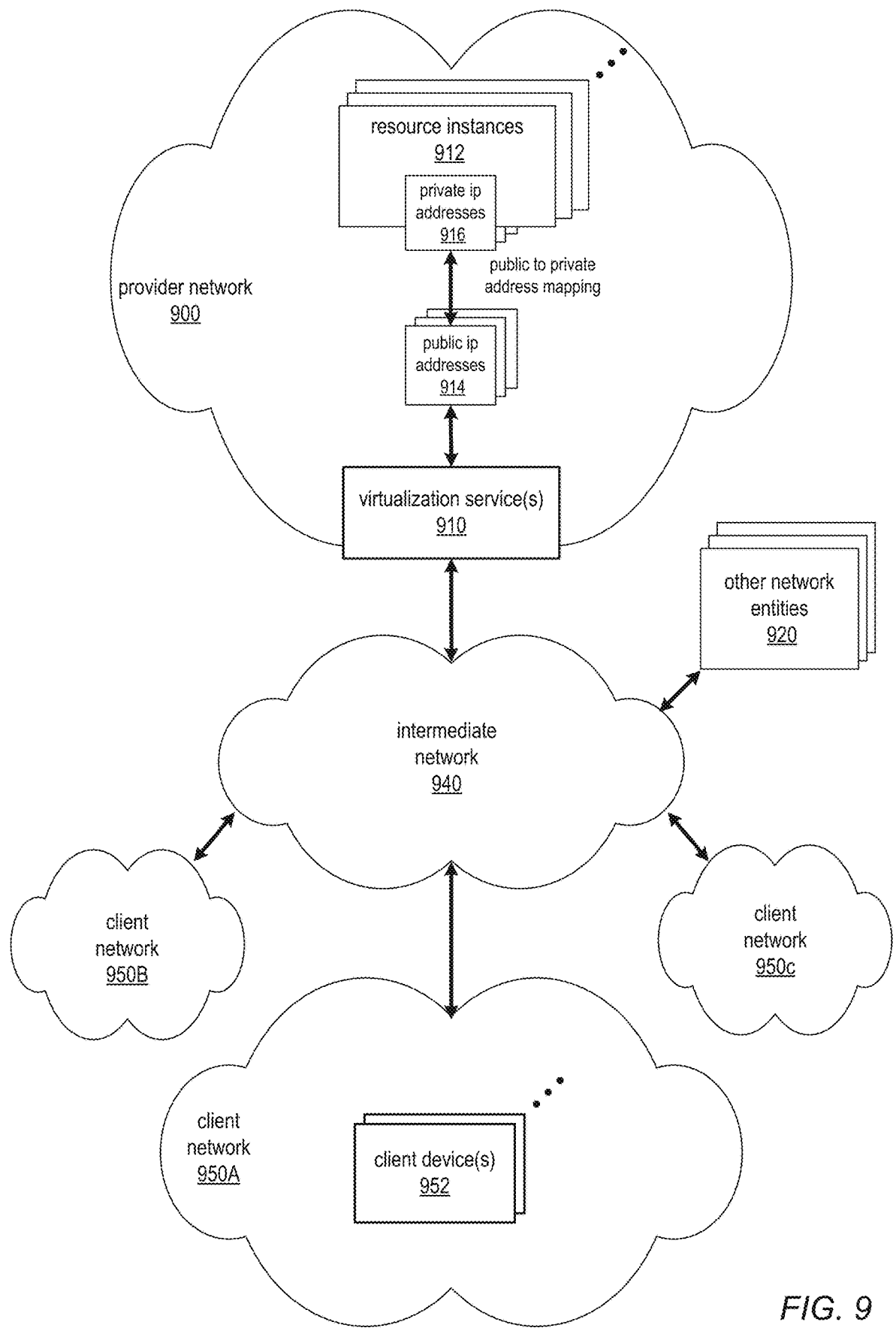
FIG. 9 illustrates an example provider network environment, according to some embodiments.

FIG. 9 illustrates an example provider network environment, according to some embodiments. A provider network 900 may provide resource virtualization to clients via one or more virtualization services 910 that allow clients to purchase, rent, or otherwise obtain instances 912 of virtualized resources, including but not limited to computation and storage resources, implemented on devices within the provider network or networks in one or more data centers. Private IP addresses 916 may be associated with the resource instances 912; the private IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that clients may obtain from the provider 900.

Conventionally, the provider network 900, via the virtualization services 910, may allow a client of the service provider (e.g., a client that operates client network 950A) to dynamically associate at least some public IP addresses 914 assigned or allocated to the client with particular resource instances 912 assigned to the client. The provider network 900 may also allow the client to remap a public IP address 914, previously mapped to one virtualized computing resource instance 912 allocated to the client, to another virtualized computing resource instance 912 that is also allocated to the client. Using the virtualized computing resource instances 912 and public IP addresses 914 provided by the service provider, a client of the service provider such as the operator of client network 950A may, for example, implement client-specific applications and present the client's applications on an intermediate network 940, such as the Internet. Other network entities 920 on the intermediate network 940 may then generate traffic to a destination public IP address 914 published by the client network 950A; the traffic is routed to the service provider data center, and at the data center is routed, via a network substrate, to the private IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a private IP address of a resource instance is the default launch configuration for all resource instance types.

At least some public IP addresses may be allocated to or obtained by clients of the provider network 900; a client may then assign their allocated public IP addresses to particular resource instances allocated to the client. These public IP addresses may be referred to as client public IP addresses, or simply client IP addresses. Instead of being assigned by the provider network 900 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

Figure 10:
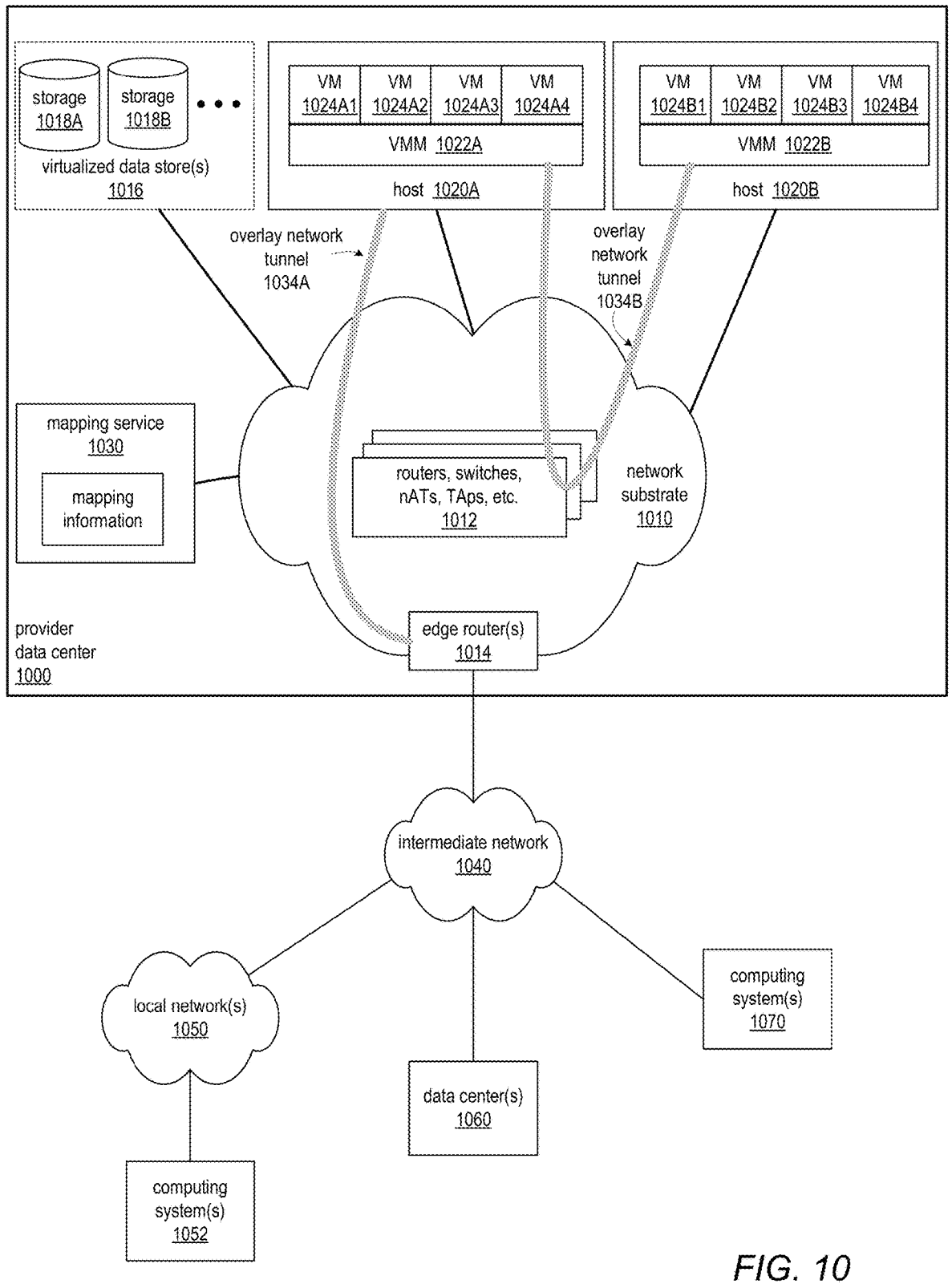
FIG. 10 illustrates an example data center that implements an overlay network on a network substrate using IP tunneling technology, according to some embodiments.

FIG. 10 illustrates an example data center that implements an overlay network on a network substrate using IP tunneling technology, according to some embodiments. A provider data center 1000 may include a network substrate that includes networking devices 1012 such as routers, switches, network address translators (NATs), and so on. Some embodiments may employ an Internet Protocol (IP) tunneling technology to provide an overlay network via which encapsulated packets may be passed through network substrate 1010 using tunnels. The IP tunneling technology may provide a mapping and encapsulating system for creating an overlay network on a network (e.g., a local network in data center 1000 of FIG. 10) and may provide a separate namespace for the overlay layer (the public IP addresses) and the network substrate 1010 layer (the private IP addresses). Packets in the overlay layer may be checked against a mapping directory (e.g., provided by mapping service 1030) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 1030) that knows where the IP overlay addresses are.

In some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 10, an example overlay network tunnel 1034A from a virtual machine (VM) 1024A on host 1020A to a device on the intermediate network 1050 and an example overlay network tunnel 1034B between a VM 1024B on host 1020B and a VM 1024C on host 1020C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 10, at least some networks in which embodiments may be implemented may include hardware virtualization technology that enables multiple operating systems to run concurrently on a host computer (e.g., hosts 1020A and 1020B of FIG. 10), i.e. as virtual machines (VMs) 1024 on the hosts 1020. The VMs 1024 may, for example, be rented or leased to clients of a network provider. A hypervisor, or virtual machine monitor (VMM) 1022, on a host 1020 presents the VMs 1024 on the host with a virtual platform and monitors the execution of the VMs 1024. Each VM 1024 may be provided with one or more private IP addresses; the VMM 1022 on a host 1020 may be aware of the private IP addresses of the VMs 1024 on the host. A mapping service 1030 may be aware of all network IP prefixes and the IP addresses of routers or other devices serving IP addresses on the local network. This includes the IP addresses of the VMMs 1022 serving multiple VMs 1024. The mapping service 1030 may be centralized, for example on a server system, or alternatively may be distributed among two or more server systems or other devices on the network. A network may, for example, use the mapping service technology and IP tunneling technology to, for example, route data packets between VMs 1024 on different hosts 1020 within the data center 1000 network; note that an interior gateway protocol (IGP) may be used to exchange routing information within such a local network.

In addition, a network such as the provider data center 1000 network (which is sometimes referred to as an autonomous system (AS)) may use the mapping service technology, IP tunneling technology, and routing service technology to route packets from the VMs 1024 to Internet destinations, and from Internet sources to the VMs 1024. Note that an external gateway protocol (EGP) or border gateway protocol (BGP) is typically used for Internet routing between sources and destinations on the Internet. FIG. 10 shows an example provider data center 1000 implementing a network that provides resource virtualization technology and that provides full Internet access via edge router(s) 1014 that connect to Internet transit providers, according to some embodiments. The provider data center 1000 may, for example, provide clients the ability to implement virtual computing systems (VMs 1024) via a hardware virtualization service and the ability to implement virtualized data stores 1016 on storage resources 1018 via a storage virtualization service.

The data center 1000 network may implement IP tunneling technology, mapping service technology, and a routing service technology to route traffic to and from virtualized resources, for example to route packets from the VMs 1024 on hosts 1020 in data center 1000 to Internet destinations, and from Internet sources to the VMs 1024. Internet sources and destinations may, for example, include computing systems 1070 connected to the intermediate network 1040 and computing systems 1052 connected to local networks 1050 that connect to the intermediate network 1040 (e.g., via edge router(s) 1014 that connect the network 1050 to Internet transit providers). The provider data center 1000 network may also route packets between resources in data center 1000, for example from a VM 1024 on a host 1020 in data center 1000 to other VMs 1024 on the same host or on other hosts 1020 in data center 1000.

A service provider that provides data center 1000 may also provide additional data center(s) 1060 that include hardware virtualization technology similar to data center 1000 and that may also be connected to intermediate network 1040. Packets may be forwarded from data center 1000 to other data centers 1060, for example from a VM 1024 on a host 1020 in data center 1000 to another VM on another host in another, similar data center 1060, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 1018, as virtualized resources to clients of a network provider in a similar manner.

Figure 11:
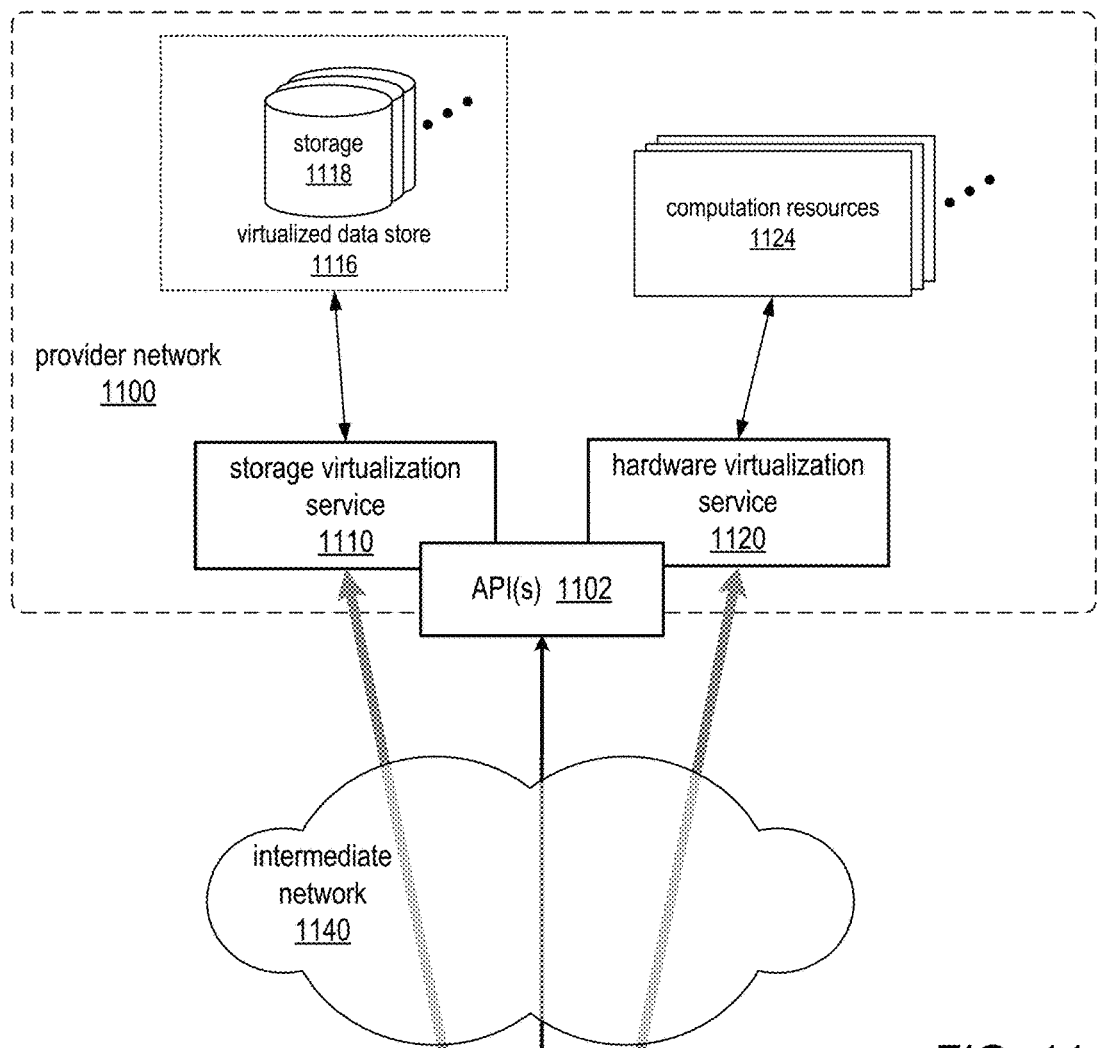
FIG. 11 is a block diagram of an example provider network that provides a storage virtualization service and a hardware virtualization service to clients, according to some embodiments.
Figure 11:
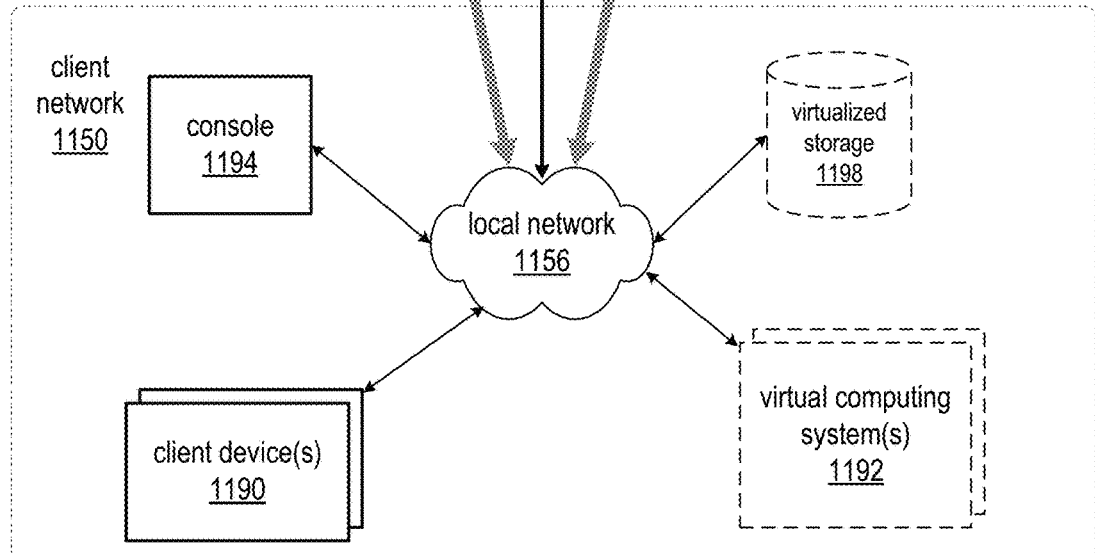

FIG. 11 is a block diagram of an example provider network that provides a storage virtualization service and a hardware virtualization service to clients, according to some embodiments. Hardware virtualization service 1120 provides multiple computation resources 1124 (e.g., VMs) to clients. The computation resources 1124 may, for example, be rented or leased to clients of the provider network 1100 (e.g., to a client that implements client network 1150). Each computation resource 1124 may be provided with one or more private IP addresses. Provider network 1100 may be configured to route packets from the private IP addresses of the computation resources 1124 to public Internet destinations, and from public Internet sources to the computation resources 1124.

Provider network 1100 may provide a client network 1150, for example coupled to intermediate network 1140 via local network 1156, the ability to implement virtual computing systems 1192 via hardware virtualization service 1120 coupled to intermediate network 1140 and to provider network 1100. In some embodiments, hardware virtualization service 1120 may provide one or more APIs 1102, for example a web services interface, via which a client network 1150 may access functionality provided by the hardware virtualization service 1120, for example via a console 1194. In some embodiments, at the provider network 1100, each virtual computing system 1192 at client network 1150 may correspond to a computation resource 1124 that is leased, rented, or otherwise provided to client network 1150.

From an instance of a virtual computing system 1192 and/or another client device 1190 or console 1194, the client may access the functionality of storage virtualization service 1110, for example via one or more APIs 1102, to access data from and store data to a virtual data store 1116 provided by the provider network 1100. In some embodiments, a virtualized data store gateway (not shown) may be provided at the client network 1150 that may locally cache at least some data, for example frequently accessed or critical data, and that may communicate with virtualized data store service 1110 via one or more communications channels to upload new or modified data from a local cache so that the primary store of data (virtualized data store 1116) is maintained. In some embodiments, a user, via a virtual computing system 1192 and/or on another client device 1190, may mount and access virtual data store 1116 volumes, which appear to the user as local virtualized storage 1198.

While not shown in FIG. 11, the virtualization service(s) may also be accessed from resource instances within the provider network 1100 via API(s) 1102. For example, a client, appliance service provider, or other entity may access a virtualization service from within a respective private network on the provider network 1100 via an API 1102 to request allocation of one or more resource instances within the private network or within another private network.

FIG. 12 illustrates an example provider network that provides private networks on the provider network to at least some clients, according to some embodiments. A client's virtualized private network 1260 on a provider network 1200, for example, enables a client to connect their existing infrastructure (e.g., devices 1252) on client network 1250 to a set of logically isolated resource instances (e.g., VMs 1224A and 1224B and storage 1218A and 1218B), and to extend management capabilities such as security services, firewalls, and intrusion detection systems to include their resource instances.

A client's virtualized private network 1260 may be connected to a client network 1250 via a private communications channel 1242. A private communications channel 1242 may, for example, be a tunnel implemented according to a network tunneling technology or some other technology over an intermediate network 1240. The intermediate network may, for example, be a shared network or a public network such as the Internet. Alternatively, a private communications channel 1242 may be implemented over a direct, dedicated connection between virtualized private network 1260 and client network 1250.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a client network.

To establish a virtualized private network 1260 for a client on provider network 1200, one or more resource instances (e.g., VMs 1224A and 1224B and storage 1218A and 1218B) may be allocated to the virtualized private network 1260. Note that other resource instances (e.g., storage 1218C and VMs 1224C) may remain available on the provider network 1200 for other client usage. A range of public IP addresses may also be allocated to the virtualized private network 1260. In addition, one or more networking devices (routers, switches, etc.) of the provider network 1200 may be allocated to the virtualized private network 1260. A private communications channel 1242 may be established between a private gateway 1262 at virtualized private network 1260 and a gateway 1256 at client network 1250.

In some embodiments, in addition to, or instead of, a private gateway 1262, virtualized private network 1260 may include a public gateway 1264 that enables resources within virtualized private network 1260 to communicate directly with entities (e.g., network entity 1244) via intermediate network 1240, and vice versa, instead of or in addition to via private communications channel 1242.

Virtualized private network 1260 may be, but is not necessarily, subdivided into two or more subnetworks, or subnets, 1270. For example, in implementations that include both a private gateway 1262 and a public gateway 1264, the private network may be subdivided into a subnet 1270A that includes resources (VMs 1224A and storage 1218A, in this example) reachable through private gateway 1262, and a subnet 1270B that includes resources (VMs 1224B and storage 1218B, in this example) reachable through public gateway 1264.

The client may assign particular client public IP addresses to particular resource instances in virtualized private network 1260. A network entity 1244 on intermediate network 1240 may then send traffic to a public IP address published by the client; the traffic is routed, by the provider network 1200, to the associated resource instance. Return traffic from the resource instance is routed, by the provider network 1200, back to the network entity 1244 over intermediate network 1240. Note that routing traffic between a resource instance and a network entity 1244 may require network address translation to translate between the public IP address and the private IP address of the resource instance.

Some embodiments may allow a client to remap public IP addresses in a client's virtualized private network 1260 as illustrated in FIG. 12 to devices on the client's external network 1250. When a packet is received (e.g., from network entity 1244), the network 1200 may determine that the destination IP address indicated by the packet has been remapped to an endpoint on external network 1250 and handle routing of the packet to the respective endpoint, either via private communications channel 1242 or via the intermediate network 1240. Response traffic may be routed from the endpoint to the network entity 1244 through the provider network 1200, or alternatively may be directly routed to the network entity 1244 by the client network 1250. From the perspective of the network entity 1244, it appears as if the network entity 1244 is communicating with the public IP address of the client on the provider network 1200. However, the network entity 1244 has actually communicated with the endpoint on client network 1250.

While FIG. 12 shows network entity 1244 on intermediate network 1240 and external to provider network 1200, a network entity may be an entity on provider network 1200. For example, one of the resource instances provided by provider network 1200 may be a network entity that sends traffic to a public IP address published by the client.

FIG. 13 illustrates subnets and security groups in an example virtual private network implementation on a provider network, according to some embodiments. In some embodiments, a provider network such as provider network 1200 in FIG. 12 may allow the client to establish and manage virtual security groups 1316 within the client's virtual private network 1310, within or across subnets 1314. A security group 1316 is a logical grouping of resource instances 1318 and acts as a virtual firewall that controls the traffic allowed to reach one or more resource instances 1318 within the security group 1316 according to security group rules. The client may establish one or more security groups 1316 within the private network 1310, and may associate each resource instance 1318 in the private network 1310 with one or more of the security groups 1316. In some embodiments, the client may establish and/or modify rules for each security group 1316 that control the inbound traffic allowed to reach the resource instances 1318 associated with the security group 1316.

In the example virtual private network 1310 shown in FIG. 13, the private network 1310 is subdivided into two subnets 1314A and 1314B. Access to the private network 1310 is controlled by gateway(s) 1330. Each subnet 1314 may include at least one router 1312 that acts to route traffic to (and from) resource instances 1318 on the respective subnet 1314. In some embodiments, network access control lists (ACLs) may be used to control access to the subnets 1314 at router(s) 1312. In the example shown in FIG. 13, resource instances 1318A through 1318E are on subnet 1314A, and resource instances 1318F through 1318J are on subnet 1314B. The client has established four security groups 1316A through 1316D. As shown in FIG. 13, a security group may extend across subnets 1314, as does security group 1316A that includes resource instances 1318A and 1318B on subnet 1314A and resource instance 1318F on subnet 1314B. In addition, a resource instance 1318 may be included in two or more security groups 1316, as is resource instance 1318A which is included in security group 1316A and 1316B.

Illustrative System

In some embodiments, a system that implements a portion or all of the methods and apparatus for providing client-defined rules for clients' resources in provider network environments as described herein may include a general-purpose computer system that includes or is configured to access one or more computer-accessible media, such as computer system 2000 illustrated in FIG. 14. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for providing client-defined rules for clients' resources in provider network environments, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 13, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 13 for implementing embodiments of methods and apparatus for providing client-defined rules for clients' resources in provider network environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices of a provider network comprising respective processors and memory to implement a provider network service, wherein the provider network service is configured to, for individual clients of one or more clients of the provider network:
provide an interface for defining rules for processing network traffic to or from a plurality of resource instances of a security group of a private network of the client that are hosted by one or more host devices of the provider network on behalf of the client, wherein the security group is a logical grouping of the plurality of the resource instances of the client;
receive, by the provider network service according to the interface, input from the client defining at least one rule for processing network traffic to or from the plurality of resource instances of the security group; and
instantiate the at least one rule at the provider network service, wherein the at least one rule is made available for application, by at least one of the host devices, to network traffic to or from at least one of the plurality of resources instance of the client.

2. The system as recited in claim 1, wherein to provide an interface for defining rules for processing network traffic to or from the plurality of resource instances of the security group of the client, the provider network service is configured to:
provide the interface for defining the rules for processing network traffic to or from resource instances of the security group on a subnet of the private network of the client on the provider network.

3. The system as recited in claim 2, wherein to receive the input from the client defining the at least one rule for processing network traffic to or from resource instances of the security group, the provider network service is configured to:
define custom rules for the security group that replace, extend, or modify default security group rules of the provider network.

4. The system as recited in claim 2, wherein to receive the input from the client defining the at least one rule for processing network traffic to or from resource instances of the security group, the provider network service is configured to:
  define a particular rule that indicates whether a given connection to resource instances of the security group is allowed or disallowed.

5. The system as recited in claim 2, wherein to provide the interface for defining the rules for processing network traffic to or from resource instances of a security group, the provider network service is configured to:
  display custom rules that replace, extend, or modify default security group rules of the provider network; and
  wherein to receive the input from the client defining the at least one rule for processing network traffic to or from resource instances of the security group, the provider network service is configured to:
    receive a selection of one or more of the custom rules displayed on the interface.

6. The system as recited in claim 2, wherein, the provider network service is further configured to:
  receive, from the client, other input; and
  based on the other input, perform one or more of:
    provision one or more of the plurality of the resource instances of the security group, or
    create the security group.

7. The system as recited in claim 1, wherein to provide an interface for defining rules for processing network traffic to or from the plurality of resource instances of the client, the provider network service is configured to:
  provide the interface for defining the rules for processing network traffic to or from resource instances on a subnet of a private network of the client on the provider network; and
  wherein to receive input from the client defining at least one rule for processing network traffic to or from the resource instances of the client, the provider network service is configured to:
    receive the input from the client defining the at least one rule for processing network traffic to or from resource instances of the subnet.

8. A method, comprising:
  performing, by one or more computing devices that implement a provider network service of a provider network:
    for individual clients of one or more clients of the provider network:
      providing an interface for defining rules for processing network traffic to or from a plurality of resource instances of a security group of a private network of the client that are hosted by one or more host devices of the provider network on behalf of the client, wherein the security group is a logical grouping of the plurality of the resource instances of the client;
      receiving, by the provider network service according to the interface, input from the client defining at least one rule for processing network traffic to or from the plurality of resource instances of the security group; and
      instantiating the at least one rule at the provider network service, wherein the at least one rule is made available for application, by at least one of the host devices, to network traffic to or from at least one of the plurality of resource instances of the client.

9. The method as recited in claim 8, wherein providing an interface for defining rules for processing network traffic to or from the plurality of resource instances of the security group of the client comprises:
  providing the interface for defining the rules for processing network traffic to or from resource instances of the security group on a subnet of the private network of the client on the provider network.

10. The method as recited in claim 9, wherein receiving the input from the client defining the at least one rule for processing network traffic to or from resource instances of the security group comprises:
  defining custom rules for the security group that replace, extend, or modify default security group rules of the provider network.

11. The method as recited in claim 9, wherein receiving the input from the client defining the at least one rule for processing network traffic to or from resource instances of the security group comprises:
  defining a particular rule that indicates whether a given connection to resource instances of the security group is allowed or disallowed.

12. The method as recited in claim 11, wherein receiving the input from the client defining the at least one rule for processing network traffic to or from resource instances of the security group comprises:
  defining one or more other particular rules that indicate one or more of a time limit for the given connection or a bandwidth limit for the given connection.

13. The method as recited in claim 9, further comprising:
  receiving, from the client, other input; and
  based on the other input, performing one or more of:
    provisioning one or more of the plurality of the resource instances of the security group, or
    creating the security group.

14. The method as recited in claim 8, wherein providing an interface for defining rules for processing network traffic to or from the plurality of resource instances of the client comprises:
  providing the interface for defining the rules for processing network traffic to or from resource instances on a subnet of a private network of the client on the provider network; and
  wherein receiving input from the client defining at least one rule for processing network traffic to or from the resource instances of the client comprises:
    receiving the input from the client defining the at least one rule for processing network traffic to or from resource instances of the subnet.

15. One or more non-transitory computer-accessible storage media storing program instructions that when executed on or across one or more processors cause the one or more processors to implement a provider network service of a provider network to, for individual clients of one or more clients of the provider network:
  provide an interface for defining rules for processing network traffic to or from a plurality of resource instances of a security group of a private network of the client that are hosted by one or more host devices of the provider network on behalf of the client, wherein the security group is a logical grouping of the plurality of the resource instances of the client;
  receive, by the provider network service according to the interface, input from the client defining at least one rule for processing network traffic to or from the plurality of resource instances of the security group; and instantiate the at least one rule at the provider network service, wherein the at least one rule is made available for application, by at least one of the host devices, to network traffic to or from at least one of the plurality of resource instances of the client.

16. The one or more storage media as recited in claim 15, wherein to provide an interface for defining rules for processing network traffic to or from the plurality of resource instances of the security group of the client, the program instructions when executed on or across the one or more processors cause the one or more processors to:

provide the interface for defining the rules for processing network traffic to or from resource instances of the security group on a subnet of the private network of the client on the provider network.

17. The one or more storage media as recited in claim 16, wherein to receive the input from the client defining the at least one rule for processing network traffic to or from resource instances of the security group, the program instructions when executed on or across the one or more processors cause the one or more processors to:

define one or more custom rules for the security group that replace, extend, or modify default security group rules of the provider network.

18. The one or more storage media as recited in claim 16, wherein to receive the input from the client defining the at least one rule for processing network traffic to or from resource instances of the security group, the program instructions when executed on or across the one or more processors cause the one or more processors to:

define a particular rule that indicates whether a given connection to resource instances of the security group is allowed or disallowed.

19. The one or more storage media as recited in claim 16, wherein to provide the interface for defining the rules for processing network traffic to or from resource instances of a security group, the program instructions when executed on or across the one or more processors cause the one or more processors to:

display custom rules that replace, extend, or modify default security group rules of the provider network; and wherein to receive the input from the client defining the at least one rule for processing network traffic to or from resource instances of the security group, the program instructions when executed on or across the one or more processors cause the one or more processors to:

receive a selection of one or more of the custom rules displayed on the interface.

20. The one or more storage media as recited in claim 15, wherein to provide an interface for defining rules for processing network traffic to or from the plurality of resource instances of the client, the program instructions when executed on or across the one or more processors cause the one or more processors to:

provide the interface for defining the rules for processing network traffic to or from resource instances on a subnet of a private network of the client on the provider network; and wherein to receive input from the client defining at least one rule for processing network traffic to or from the resource instances of the client, the program instructions when executed on or across the one or more processors cause the one or more processors to:

receive the input from the client defining the at least one rule for processing network traffic to or from resource instances of the subnet.

\* \* \* \* \*